United States Patent [19]
Kimoto et al.

[11] Patent Number: 4,929,979
[45] Date of Patent: May 29, 1990

[54] METHOD AND APPARATUS FOR PROCESSING IMAGE

[75] Inventors: Tetsuo Kimoto; Yoshinori Abe, both of Hachioji, Japan

[73] Assignee: Konica Corporation, Japan

[21] Appl. No.: 303,724

[22] Filed: Jan. 27, 1989

[30] Foreign Application Priority Data

Jan. 29, 1988 [JP] Japan .................................. 63-18868
Jan. 29, 1988 [JP] Japan .................................. 63-18877
Jan. 29, 1988 [JP] Japan .................................. 63-18878
Aug. 2, 1988 [JP] Japan .................................. 63-193038

[51] Int. Cl.$^5$ ............................................ G03B 27/72
[52] U.S. Cl. .................................... 355/38; 358/80; 358/457
[58] Field of Search ................. 355/38, 77, 327; 358/75, 80, 457, 443, 447

[56] References Cited
U.S. PATENT DOCUMENTS 4,710,822 12/1987 Matsunawa ................... 358/457 X
4,742,400 5/1988 Tsuji ................................. 358/457
4,841,361 6/1989 Matsunawa ......................... 358/80

Primary Examiner—L. T. Hix
Assistant Examiner—D. Rutledge

[57] ABSTRACT

According to a method and apparatus for processing an image, density data representing a density of each pixel of original image data and color data representing a color of each pixel are generated. The density and color data are generated as parallel data. A write mode of a memory is set. A memory content is repeated updated in correspondence with the density data and the color data. A read mode of the memory is set. A memory content corresponding to one of the color data is externally read out. Threshold values are set in units of color data on the basis of the memory content read out from the memory. Recording density data having a smaller number of bits is formed by the set threshold values on the basis of the density data. Recording is performed on the basis of the formed recording density data.

7 Claims, 29 Drawing Sheets

1: COLOR IMAGE PROCESSING APPARATUS

FIG. 3
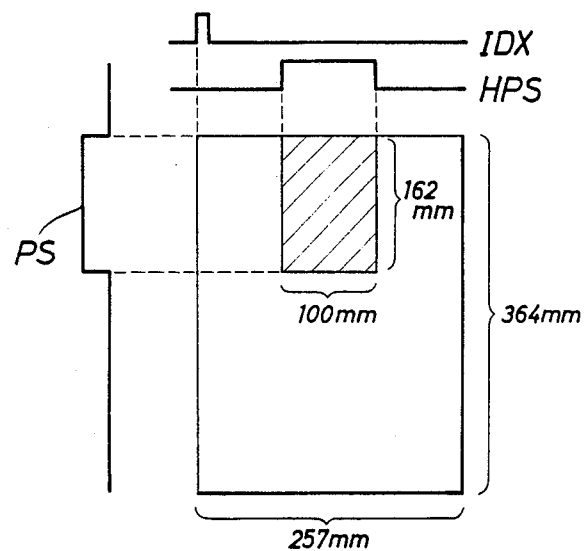
FIG. 4
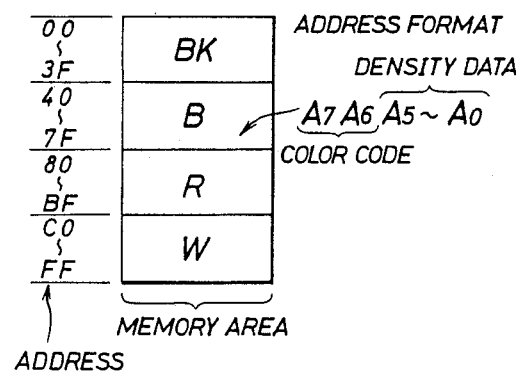
FIG. 5
| COLOR | COLOR CODE | |
|-------|---|---|
| BK | 0 | 0 |
| B  | 0 | 1 |
| R  | 1 | 0 |
| W  | 1 | 1 |

FIG. 9
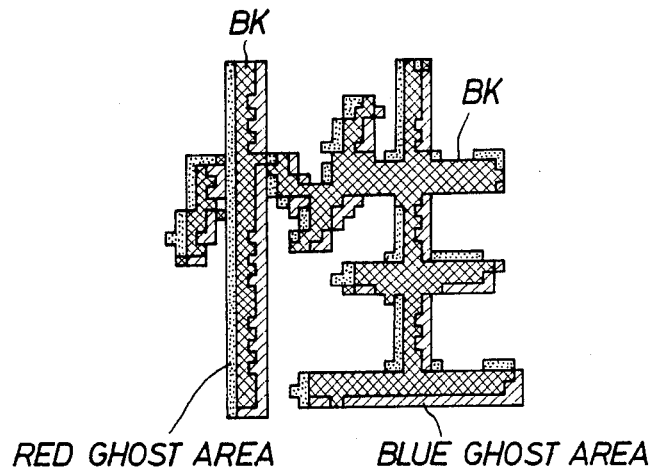
FIG. 10A  FIG. 10B  FIG. 10C
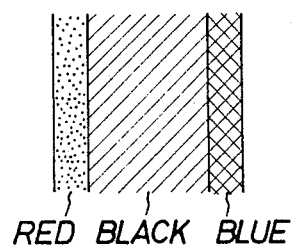 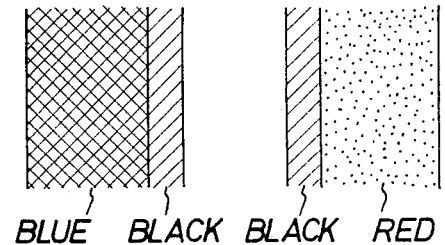

BLUE MARKER

MARKER SIGNAL BP(RP)

AREA SIGNAL Q$_B'$(Q$_R'$)

200: POINT DETECTION ROUTINE OF EACH COLOR HISTOGRAM

BACKGROUND TYPE HISTOGRAM

CHARACTER TYPE HISTOGRAM

BACKGROUND TYPE HISTOGRAM

MIXED TYPE HISTOGRAM

CHARACTER TYPE HISTOGRAM

BACKGROUND TYPE HISTOGRAM

HISTOGRAM BLACK PORTION

HISTOGRAM RED PORTION

HISTOGRAM BLUE PORTION

MIXED TYPE HISTOGRAM

TOTAL HISTOGRAM (OLD NEWSPAPER)

200 : POINT DETECTION ROUTINE OF EACH INDIVIDUAL COLOR HISTOGRAM

250: OMISSION DETECTION ROUTINE OF EACH INDIVIDUAL COLOR HISTOGRAM

210 : HISTOGRAM SHAPE DETERMINATION ROUTINE

HISTOGRAM: BLACK CHARACTER PORTION

HISTOGRAM: BLUE CHARACTER PORTION

HISTOGRAM: RED CHARACTER PORTION

TOTAL HISTOGRAM (MULTICOLOR TEST CHART)

HISTOGRAM: WHITE BACKGROUND PORTION

HISTOGRAM: BLACK PORTION

HISTOGRAM: RED PORTION

HISTOGRAM: BLUE PORTION

TOTAL HISTOGRAM (OLD NEWSPAPER)

METHOD AND APPARATUS FOR PROCESSING IMAGE

BACKGROUND OF THE INVENTION

1. Field of the Invention

The present invention relates to a method and apparatus for processing an image in a color copying machine for normal paper recording and, more particularly, to a method and apparatus for processing an image wherein various parameters for image data formation can be automatically calculated.

2. Description of the Prior Art

In a conventional image processing apparatus such as a color copying machine using a laser beam, a laser beam must be modulated on the basis of final image data to form a latent image of a predetermined object on a photosensitive drum. In this case, image data for laser beam modulation must be generated on the basis of original image data.

In recent years, in order to record a halftone image, a laser beam tends to be modulated not by simple binary data but by image data of three or more values or analog image data.

It is important to balance image color densities particularly in a color copying machine.

A conventional image processing apparatus employs fixed threshold values for image data formation, thus posing the following problems.

(1) A so-called fog is formed in a recorded image when a document has a high background density level, thus degrading image quality.

(2) In order to eliminate a fog, it is effective to change the threshold values. However, it is very difficult to manually change the threshold values without skills.

(3) When output characteristics of a document reading apparatus are changed by external factors, a good color balance cannot be maintained. The only way of recovering a good color balance is to set the threshold values again by observing the recorded image. Therefore, more advanced skills are required.

Conditions in units of colors at the time of image data generation are not limited to the threshold values but must also include an MTF correction parameter.

SUMMARY OF THE INVENTION

It is an object of the present invention to provide a method and apparatus for recording a multi-color image on the basis of input multi-color image data, wherein identical simple circuits are arranged for the respective colors to process image data to achieve image data processing in units of colors without complicating a circuit arrangement, and particularly, threshold values in units of colors for binary or multi-value processing can be set.

According to the present invention, original image data is input to determine a color of each pixel and its density, and color and density signals are output as parallel signals. A specific area of a memory is designated by the color signal, and density data is stored in the specific area. In this case, a density value is not directly stored as the density value but as statistical data. For example, the frequency of density values is counted to form a so-called density histogram, or maximum and minimum values are stored as statistical data. The operations up to this point need not be performed for one frame of an original image. For example, these operations may be performed for part of the original image, or the original image is appropriately sampled to perform these operations for a smaller number of pixels.

The statistical data is stored in units of colors. Therefore, image data formation operations of the respective colors can be independently performed. A threshold value for forming an image data of one bit or two or more bits can be determined in units of colors. As a result, the threshold value can be automatically determined, the background can be eliminated without any special operations, and a recorded image always having a constant balance can be obtained.

BRIEF DESCRIPTION OF THE DRAWINGS

FIG. 3 is a view showing a prescan area;

FIG. 4 a view showing a relationship between image data and areas;

FIG. 5 is a table showing a relationship between colors and color code data;

FIG. 9 and FIGS. 10A to 10C are views for explaining color ghost components;

DETAILED DESCRIPTION OF THE PREFERRED EMBODIMENTS

Figure 1:
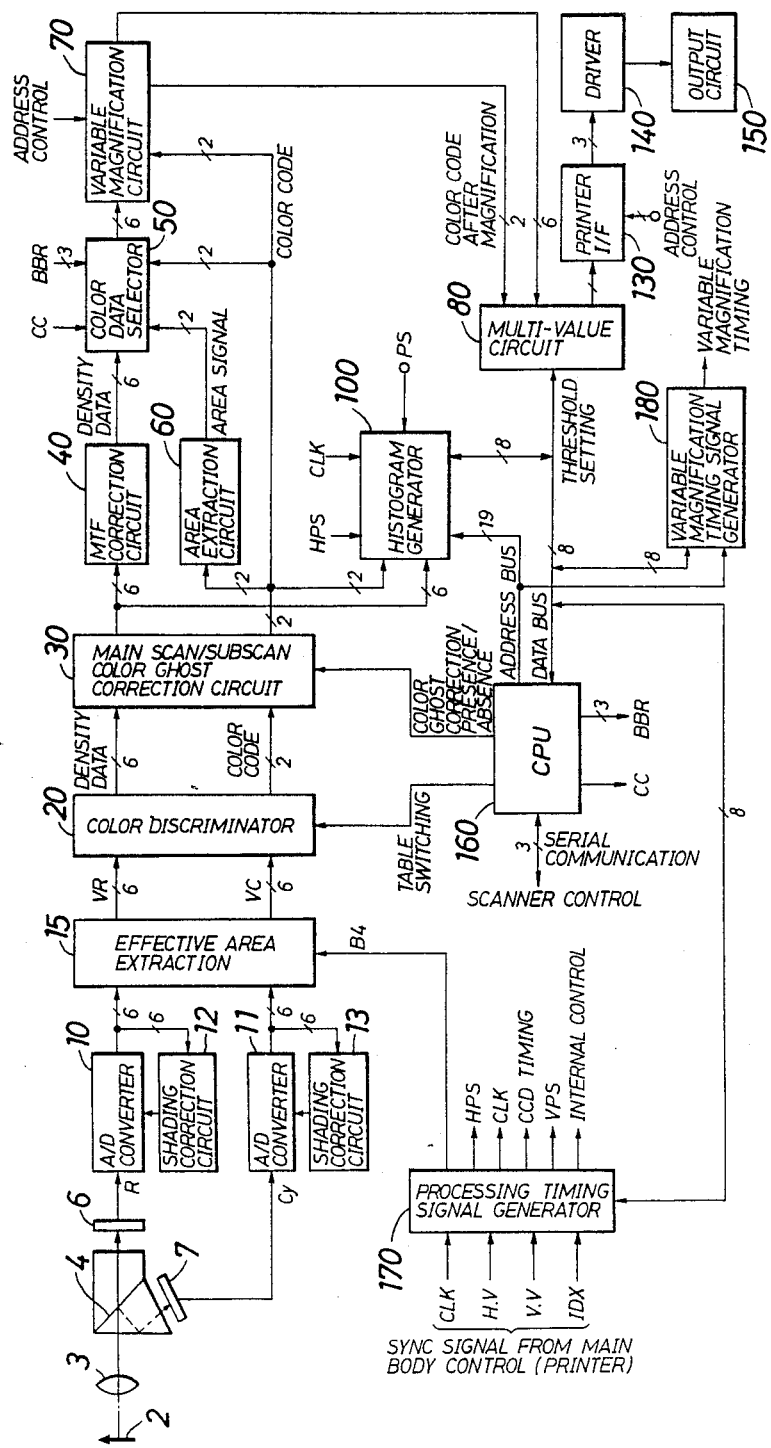
FIG. 1 is a block diagram of an image processing apparatus according to an embodiment of the present invention.

Color image information (optical image) of an object 2 such as a document is separated into two color-separated images by a dichroic mirror 4 through an optical system 3. In this embodiment, the optical image is separated into a red (R) color-separated image and a cyan (Cy) color-separated image. For this purpose, the cutoff frequency of the dichroic mirror 4 is about 540 to 600 nm.

The red (R) and cyan (Cy) color-separated images are supplied to image reading means such as CCDs 6 and 7. The CCDs 6 and 7 extract image signals respectively consisting of only the red (R) and cyan (Cy) components.

Image signals R and Cy are respectively supplied to A/D converters 10 and 11 and converted thereby into digital signals each having a predetermined number of bits, 6 bits in this embodiment. At the same time, the image signals R and Cy are subjected to shading correction. Reference numerals 12 and 13 denote shading correction circuits.

Only a maximum document size width signal component is extracted by an effective area extraction circuit 15 from the shading-corrected digital image signals and is supplied to a color discriminator 20. When a maximum document width is a B4 size, a size signal B4 generated by a processing timing signal generator 170 is used as a gate signal.

If the shading-corrected digital image signals are defined as VR and VC, respectively, these image signals VR and VC are supplied into the color discriminator 20 and are separated into a plurality of color signals.

In this embodiment, the image signals are separated into three color signals, i.e., red, blue, and black signals.

More specifically, regardless of a document color, each pixel is classified into one of red, blue, and black pixels. By this processing, each portion of the document is recognized as one of the red, green, and blue portions.

Color discrimination includes an operation for discriminating each image portion to have one of red, blue, and black. The number of reference colors is not limited to three but can be four or more.

Each color-discriminated color signal consists of color code data (2-bit data) and its density data (6-bit data). The data of the color signals are stored in a color discrimination conversion table (map) comprised of a ROM.

Figure 8:
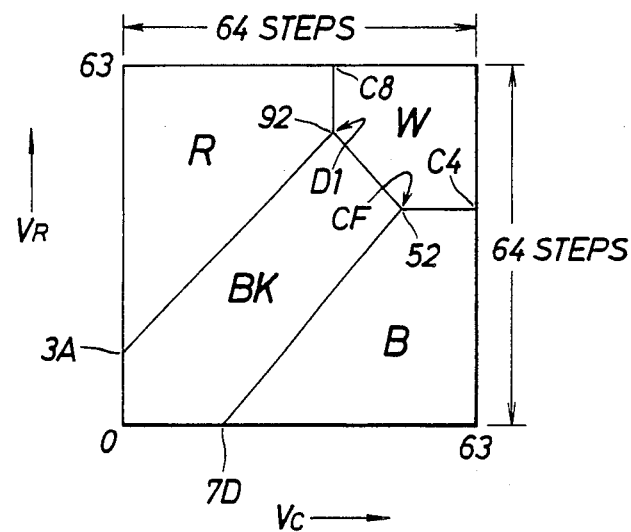
FIG. 8 is a chart showing a color discrimination map.

FIG. 8 shows a color discrimination map.

The color-discriminated image data are then used in color image processing.

First, the color-discriminated image data are supplied to a color ghost correction circuit 30, and color ghost components in a main scan direction (horizontal scan direction) and a subscan direction (drum rotational direction).

Color ghost elimination is performed since unnecessary color ghost components around black characters are generated during color discrimination.

Generation of color ghost components is shown in FIG. 9.

FIG. 9 shows color ghost components appearing upon color discrimination when a black Chinese character " " is imaged.

As is apparent from FIG. 9 and FIGS. 10A to 10C, red and blue ghost components appear at edges of a black line, a black ghost component appears at an edge of a blue line, and a black ghost component appears at an edge of a red line.

It is apparent that the ways of generating color ghost component are different in combinations of other colors.

A color ghost correction circuit 30 minimizes the color ghost components as much as possible.

Only color code data are subjected to color ghost processing.

Image processing operations include resolution correction, partial color conversion, variable magnification processing, multi-value processing in addition to color ghost correction.

Density data of image data (color code data and density data) after color ghost correction is processed by a resolution (MTF) correction circuit 40. Therefore, the resolution (MTF) is corrected.

Causes for degrading the resolution are an optical system, an optical drive system, a signal processing system, a recording system, and the like. Of these causes, the cause which directly adversely affects degradation of the resolution is errors in an optical system (document reading apparatus) and its drive system.

Figure 11A:
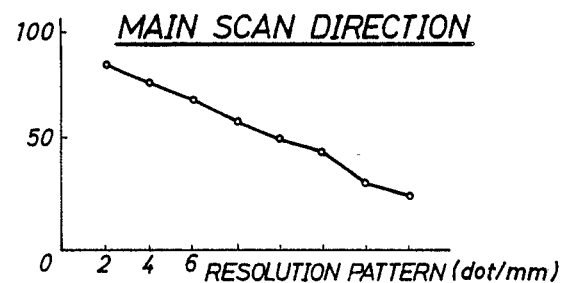
FIGS. 11A and 11B and FIGS. 12A and 12B are graphs for explaining resolution correction.
Figure 11B:
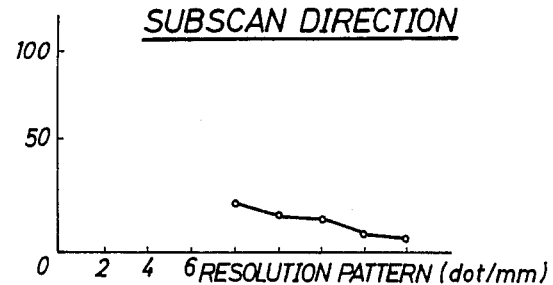

FIGS. 11A and 11B show MTF values (prior to correction), respectively, in the main scan and subscan directions when the optical system is driven. These characteristic curves are obtained when a monochromatic pattern having a spatial frequency of 2 to 16 dots/mm is scanned.

In this case, the resolution MTF is defined as follows:

$$MTF = (W - BK)/(W + BK) \; (\%)$$

where W is a white signal and BK is a black signal.

MTF degradation in the subscan direction is worse than that in the main scan direction. In order to equally correct errors in the main scan and subscan directions, a correction amount in the subscan direction can be set to be 2 to 4 times that in the main scan direction.

In order to equally correct errors in the main scan and subscan directions and to prevent degradation of reproducibility of a thin line, a convolution filter which uses image data of 3×3 pixels may be used.

Figure 12A:
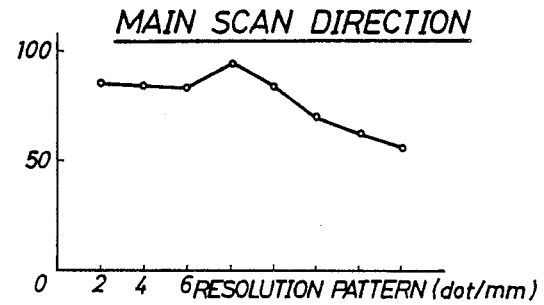
Figure 12B:
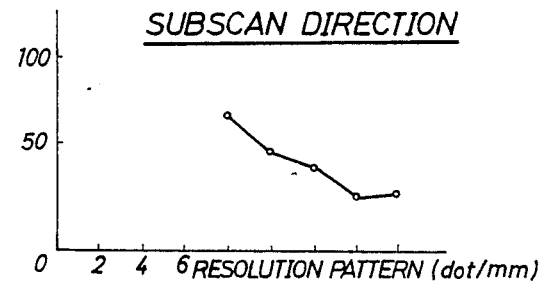

Correction results obtained when the convolution filter is used are shown in FIGS. 12A and 12B.

The resolution-corrected density data and the color code data are supplied to a color data selector 50. When a partial color conversion mode is selected, its image area is recorded with a specific color.

The partial color conversion mode is defined as a mode for recording with a marker color an area surrounded by a marker (color marker) in a monochromatic document.

Figure 13:
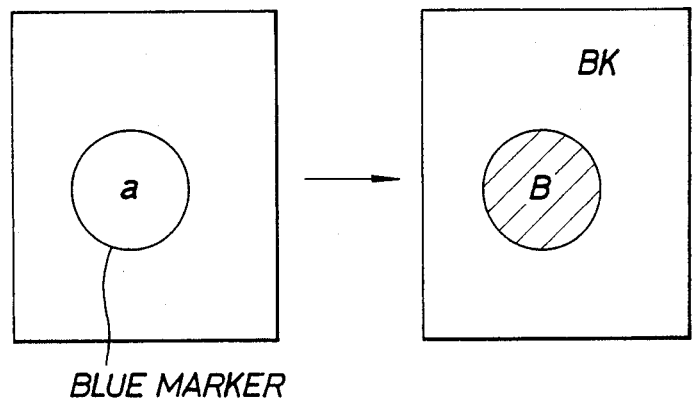
FIGS. 13 and 14 are views for explaining partial color conversion.

As shown in FIG. 13, an area a surrounded by a blue marker is recorded with blue in the partial color conversion mode.

For this purpose, a color marker must be detected, and a partial color conversion area must be extracted.

An area extraction circuit 60 is arranged to extract the partial color conversion area. A color marker area on a document is detected, and its area signal is supplied to the data selector 50.

Figure 14:
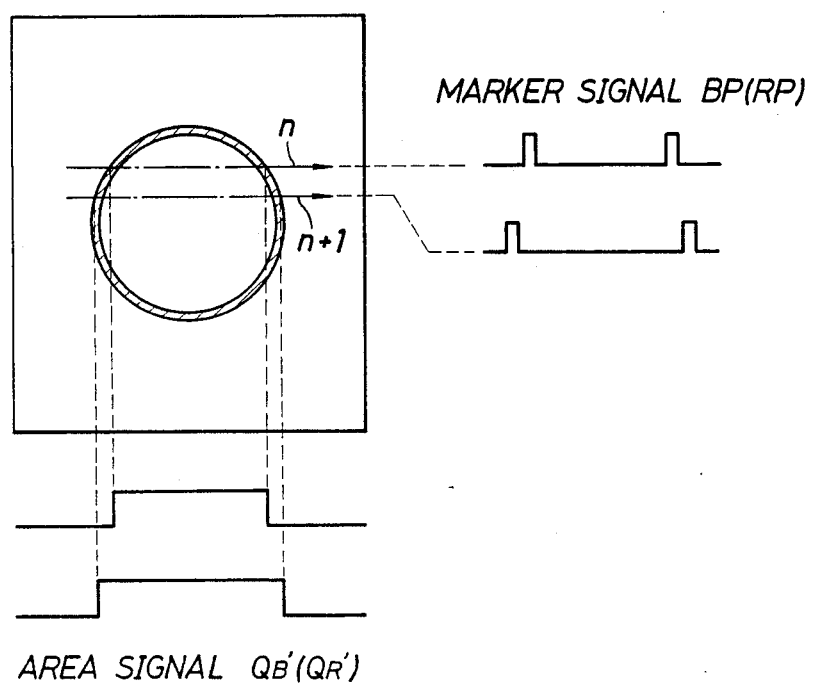

As shown in FIG. 14, area signals QR and QB corresponding to marker areas are output from the area extraction circuit 60.

In addition to these signals, the data selector 50 receives a scan code signal BBR representing a currently copied color and a partial color conversion signal CC.

In a multi-color copying machine capable of recording information with a plurality of specific colors, each color is developed every revolution of the photosensitive drum. When all colors are developed, the photosensitive drum revolves once to transfer the image to a sheet and separate the sheet from the photosensitive drum. In this color copying machine, the currently developed color is represented by the scan code signal BBR.

When a blue marker is detected in a blue copy sequence and an area signal is generated, the corresponding color data is output, so that an image within the blue marker can be recorded with blue.

When partial color conversion processing is not executed and only color code data coincides with the scan code signal BBR, density data is output. That is, in a red copy sequence, the corresponding density data is selectively output while the red color code is being obtained.

An image represented by image data (density data) output from the color data selector 50 is enlarged/reduced by a variable magnification circuit 70.

Enlargement/reduction processing is performed by interpolating the density data in the main scan direction and controlling a scan speed in the subscan direction (i.e., a rotational direction of the photosensitive drum).

When the scan speed is reduced, subscan sampling data is sampled and therefore reduction processing is performed. Otherwise, enlargement processing is performed.

In this embodiment, color code data is also subjected to enlargement/reduction processing.

Enlarged/reduced-image density data is subjected to multi-value processing by a multi-value circuit 80. For example, when four threshold values are used, 6-bit density data is processed into five-value data.

Figure 15:
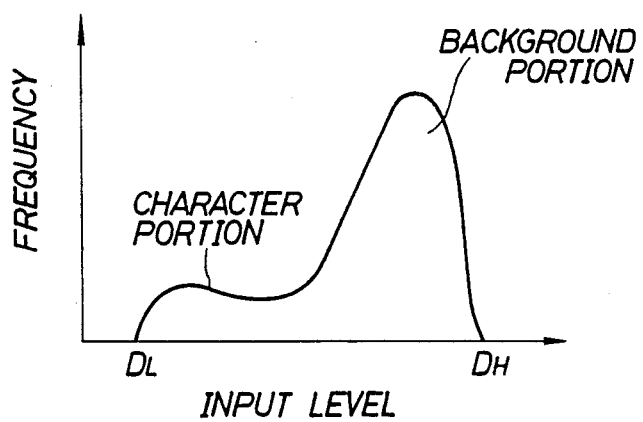
FIG. 15 is a density histogram.

The threshold data are automatically set. In this case, prior to actual scan of a document, the document is prescanned to detect density data. A density histogram shown in FIG. 15 is generated on the basis of the density data output. Threshold values are determined on the basis of the density histogram. Determination of threshold values will be described in detail later.

3-bit multi-value data after multi-value processing is supplied to a driver 140 through an interface circuit 130.

The driver 140 modulates a laser beam in correspondence with the multi-value data. In this embodiment, laser beam radiation time per pixel is modulated (to be referred to as PWM modulation hereinafter).

The driver 140 may incorporate the multi-value circuit 80.

The photosensitive drum arranged in an output circuit 150 is developed by a PWM-modulated laser beam.

The output circuit 150 comprises a laser recording apparatus.

A developing unit may be of an electrophotographic color copying machine. In this embodiment, two-component non-contact reversal development is employed.

A transfer drum used in conventional color image formation is not used in this embodiment. In order to provide a compact apparatus, blue, red, and black toner images are developed on an image formation OPC photosensitive body (drum) by three revolutions. After the developing operations, the drum revolves once to transfer an image to recording paper such as normal paper.

Reference numeral 170 denotes a processing timing signal generator for generating various timing signals. The processing timing signal generator 170 receives a clock CLK, horizontal and vertical sync signals HV and VV associated with the main scan and subscan directions and obtained from the output circuit 150, and an index signal IDX representing the start of laser beam scan. Reference numeral 180 denotes a timing signal generator for obtaining a variable magnification timing.

In this embodiment, generation and selection of threshold value data for multi-value processing are performed by a CPU 160.

For this reason, a histogram generator 100 is arranged, and generation of the density histogram and a threshold value (a plurality of threshold values for multi-value processing) calculated in units of colors from the density histogram data are processed by the CPU 160.

A data bus of the CPU 160 is also connected to the multi-value circuit 80 due to the above reason.

In this embodiment, the histogram generator 100 generates individual color histograms to perform optimal image data formation in units of colors and calculates threshold data in units of colors. Color code data in addition to density data are supplied to the histogram generator 100.

At the time of generation of a density histogram, an entire image area or a predetermined image area (part of the total image area) is prescanned to obtain image data.

Only the predetermined area is prescanned to obtain density data because a prescan time is not so long and density data necessary for forming the density histogram can be acquired from the predetermined area.

The prescan time falls within a warming-up time of the copying machine. The copying machine requires the warming-up time due to the following reason.

First, a rotary polygonal mirror for deflecting and scanning an optical signal (i.e., signal such as a laser beam which is modulated by a multi-value signal) emitted to the photosensitive drum is arranged in the copying machine. In order to stabilize rotation of the rotary polygonal mirror, a certain warming-up time is required.

Second, in order to stabilize the copy process, pre-rotation (within one revolution) of the photosensitive drum must be performed.

The warming-up time is about 2 to 3 seconds. The prescan time is almost equal to the warming-up time and preferably falls within the warming-up time.

When this time duration is set as the prescan time, the predetermined area to be prescanned is limited.

In order to prevent this drawback, the image data is sampled while being sampled in the main scan direction (lateral direction in FIG. 3). The scan speed of the optical system in the subscan direction (vertical direction) is higher than that in normal recording, thereby sampling necessary image information for threshold value calculations.

For example, when a resolution is given as 16 dots/mm, sampling is performed every 1 dot/mm in the horizontal direction.

The scan speed in the subscan direction is selected about 4 times that in the main scan direction. Therefore, each image data is sampled every four lines. This operation also indicates that an average value of the image data within the predetermined area is detected as density data by four-time scan.

When the scan speeds are selected as described above and the maximum document size is given as B4, the predetermined area (indicated by hatched lines) of 1/5 to 1/6 the maximum document size is given as the prescan range.

The image data detected within this range is used to generate a density histogram.

Figure 2:
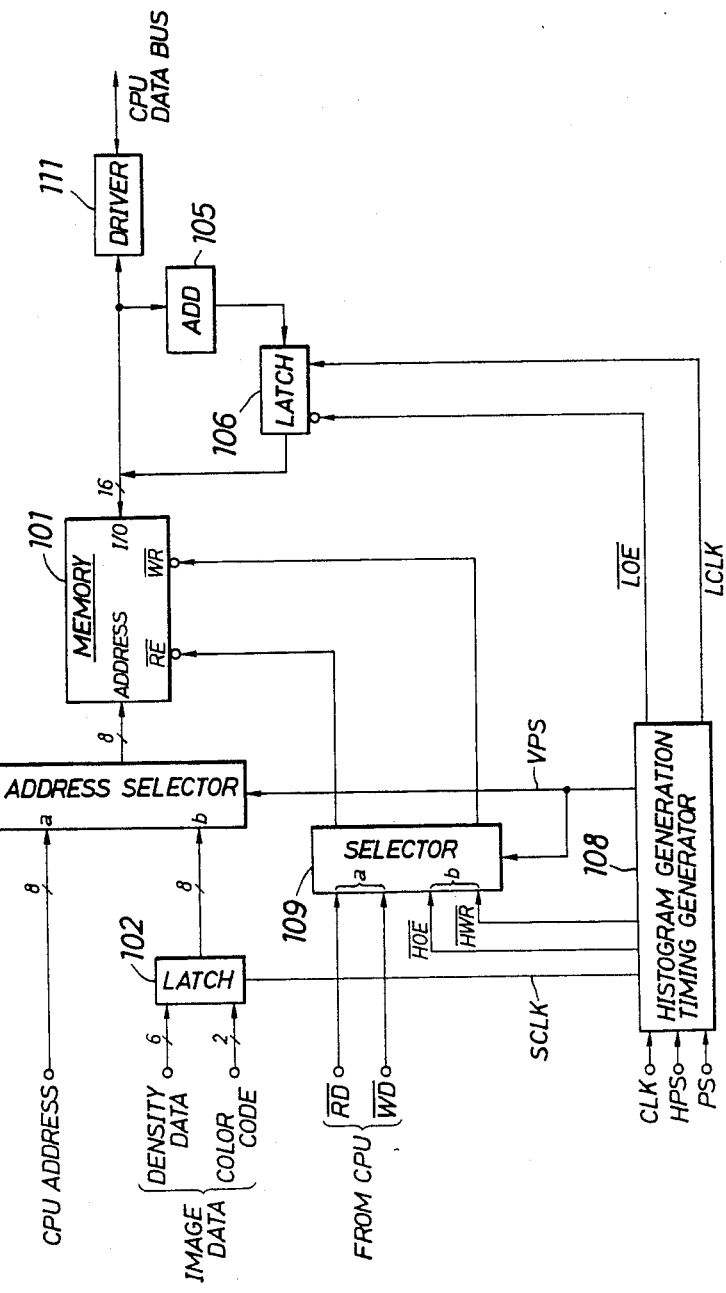
FIG. 2 is a block diagram showing a density histogram generator shown in FIG. 1.

For this purpose, the histogram generator 100 is arranged as shown in FIG. 2.

Referring to FIG. 2, reference numeral 101 denotes a memory for storing density histogram data (values representing the frequency of occurrence) on the basis of the density data obtained by a prescan.

When a color document is to be processed, optimal threshold values are calculated in units of colors, and multi-value processing is performed on the basis of the optimal threshold values, thereby recording an image with good color reproducibility.

In order to determine threshold values in units of colors, individual color histograms are generated. In this case, the memory 101 has memory areas (FIG. 4) in units of colors.

Color code data for distinguishing the memory areas from each other is used as upper address data for the memory 101 (FIG. 4).

Color code data are shown in FIG. 5.

In this embodiment, the frequency for the density histogram is calculated by directly using the readout image data. At the end of a prescan, density histogram data is stored in the memory 101.

Since the density histogram data are necessary for calculating threshold values, these data can be accessed by address data sent from the CPU 160 in addition to the image data.

For this reason, the memory 101 has the following peripheral circuit arrangement.

A latch circuit 102 and an address selector 103 are arranged on the address terminal side of the memory 101. Image data (density data and color code data) read out by the prescan is temporarily latched by the latch circuit 102 and is supplied as address data to the memory 101 through the address selector 103.

Address data sent from the CPU 160 is also supplied to the memory 101 through the address selector 103.

The image data is used during generation of the density histogram, while the address data from the CPU 160 is used in the threshold value calculation mode.

A latch pulse applied to the latch circuit 102 is generated as follows.

Figure 6:
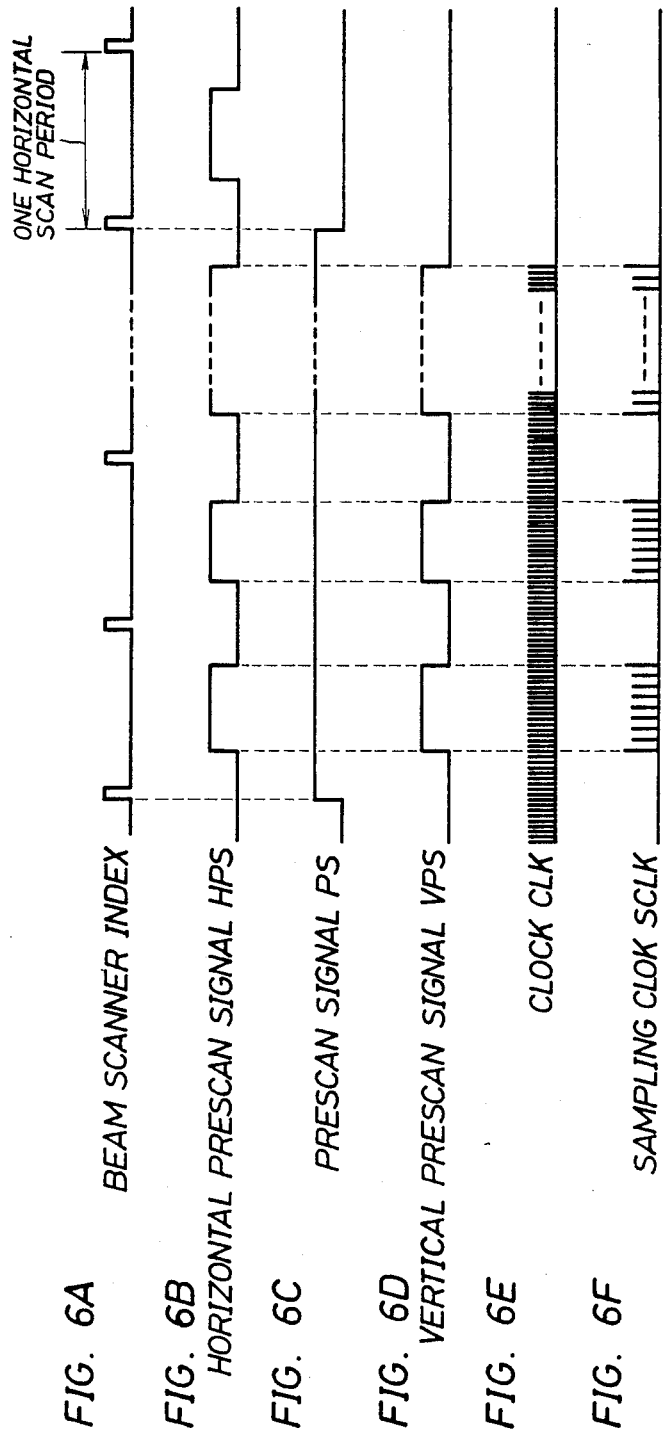
FIGS. 6A to 6F and FIGS. 7A to 7F are waveform charts for explaining histogram generation operations, respectively.

As described above, when the resolution is given as 16 dots/mm, a sampling clock (FIG. 6F) obtained by frequency-dividing fundamental clock CLK (FIG. 6E) by 1/16 is used as the latch pulse.

The sampling clock SCLK and the like are generated by a histogram generation timing generator 108. The fundamental clock CLK is supplied to the generator 108.

The generator 108 receives a prescan signal HPS for determining a horizontal prescan width and a prescan signal PS (FIGS. 6B and 6C) for determining a vertical prescan width. These signals will be described later.

The address selector 103 receives the vertical prescan signal VPS (FIG. 6D) as its selection signal.

A selector 109 is arranged to switch between a read enable signal and a write signal in the density histogram generation mode and the threshold calculation mode. For this reason, read and write signals $\overline{HOE}$ and $\overline{HWR}$ (FIGS. 7C and 7F) generated by the generator 108 are supplied to the selector 109. Read and write signals $\overline{RD}$ and $\overline{WD}$ similar to the signals $\overline{HOE}$ and $\overline{HWR}$ are supplied from the CPU 160 to the selector 109.

These selection signals are selected by the prescan signal VPS.

The following means is employed to directly generate a density histogram from the image data supplied to the memory 101.

In this embodiment, the means includes an adder 105 for incrementing the data (frequency data) read out to the I/O port of the memory 101 by one and a latch circuit 106 for latching an output from the adder 105. A latch output is stored through the I/O port in a memory area at the same address of the memory 101 from which the data is read out.

An enable signal $\overline{LOE}$ (FIG. 7D) as a latch output and the latch clock LCLK (FIG. 7E) are supplied to the latch circuit 106 to control a latch timing or the like.

In the density histogram generation mode, a memory area of the memory 101 is selected by the color code data of the image data, and its address is selected by the corresponding density data value.

Figure 7:
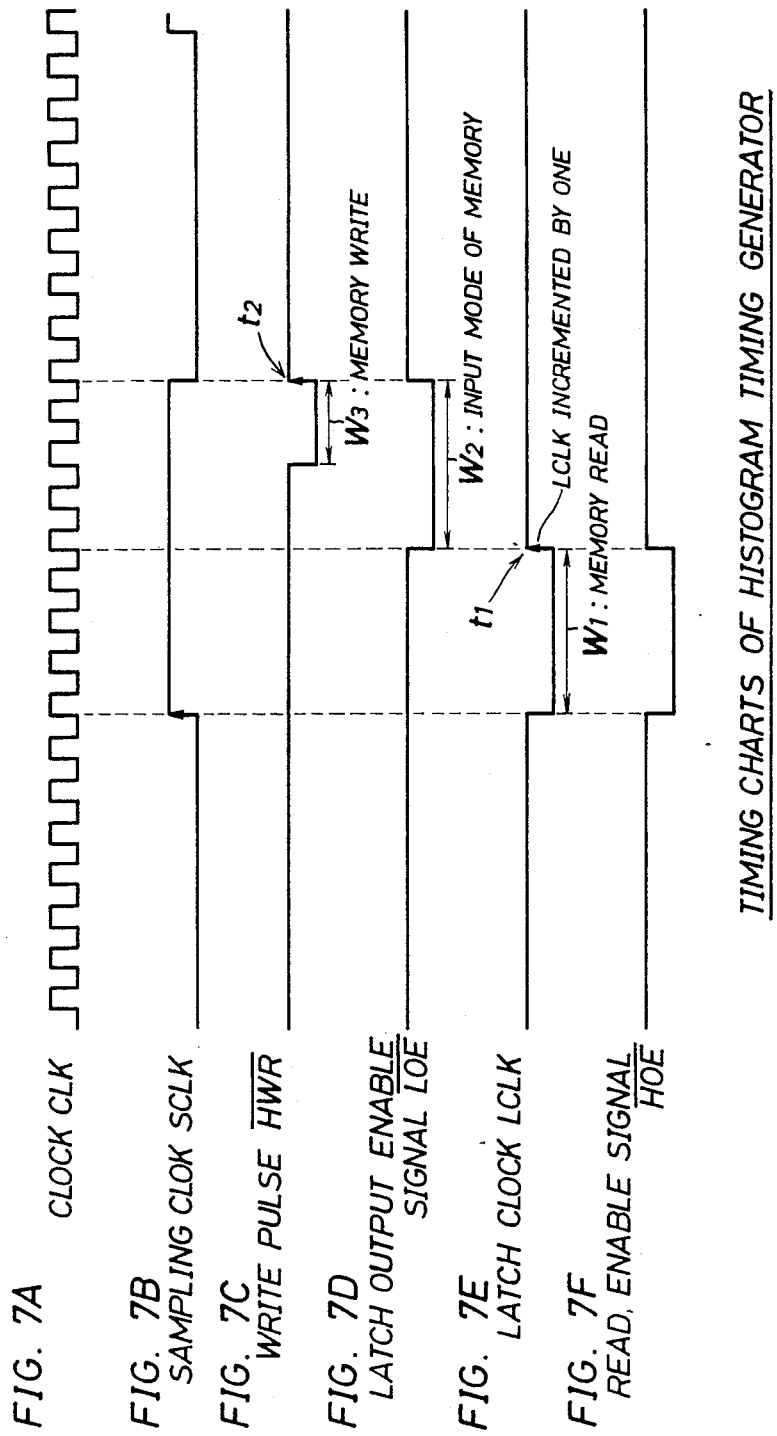

When the image data is supplied, the memory 101 is set in a read enable state in response to the read enable signal $\overline{HOE}$ (FIG. 7F). The data (i.e., a value representing a frequency) stored at the accessed address is read out. The readout data is incremented by one by the adder 105.

At a leading edge (time t1) of the latch clock LCLK (FIG. 7E), a sum output is latched. Thereafter, the latch circuit 106 is enabled in response to the enable signal $\overline{LOE}$. For this reason, a latch output is rewritten at time t2, i.e., at the leading edge of the write signal $\overline{HWR}$ (FIG. 7C).

A duration from read access to write access of the memory 101 is a duration for which the latch 102 is kept enabled in response to the sampling clock SCLK (FIGS. 7C and 7E).

Data at the accessed address is incremented and the incremented data is rewritten. These operations are repeated to store data representing the frequency of the identical data at the identical addresses.

When the prescan is completed, the density histogram (FIG. 15) on the basis of the density data within the prescan area is stored in the memory 101.

Image data read access and generation of the density histogram can be simultaneously performed. For this reason, all density data within the prescan range need not be stored in the memory. Therefore, the capacity of the memory 101 can be greatly decreased. A histogram need not be generated by the CPU, and therefore the total processing time can be shortened.

The data of the generated density histogram are referred to by address data from the CPU 160 when the threshold values are calculated. The density histogram data is fetched by the CPU 160 through the driver 111. The CPU 160 calculates threshold values suitable for the image in units of colors by using this density histogram.

The calculated threshold data are supplied to the multi-value circuit 80, and multi-value processing is performed for the density data on the basis of the calculated threshold value data.

An operation for setting threshold values by the density histogram generator 100 under the control of the CPU 160 will be described below.

The density histogram generator 100 generates density histograms in units of colors, and the generated density histogram data are processed by the CPU 160, thereby calculating the threshold values in units of colors.

A threshold value setting means comprises the density histogram generator 100 and the CPU 160.

The following operations are performed in order to calculate threshold values in units of colors.

Figure 16:
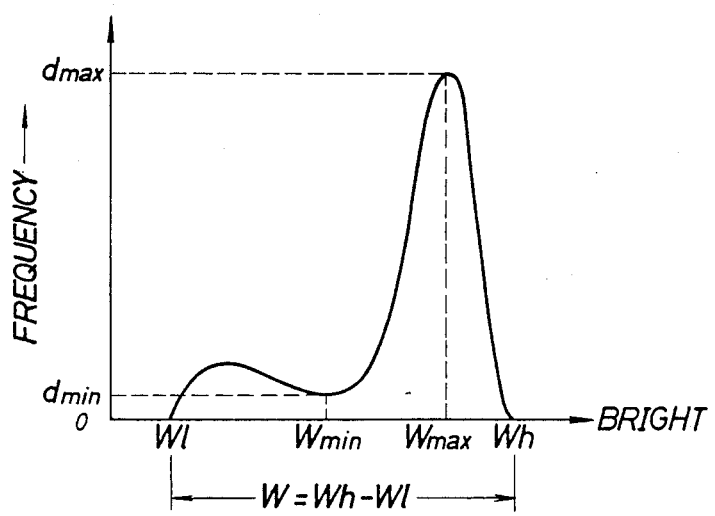
FIG. 16 is an individual color density histogram.

Maximum and minimum values Wh and Wl and maximum and minimum frequencies dmax and dmin, maximum and minimum luminance levels Wmax and Wmin, and a luminance level width W (Wh-Wl) are calculated from the density histogram (e.g., a density histogram in FIG. 16).

A histogram shape is determined by these data.

Histogram shapes can be classified into background, character, and mixed type histograms and other types of histogram.

Figure 20:
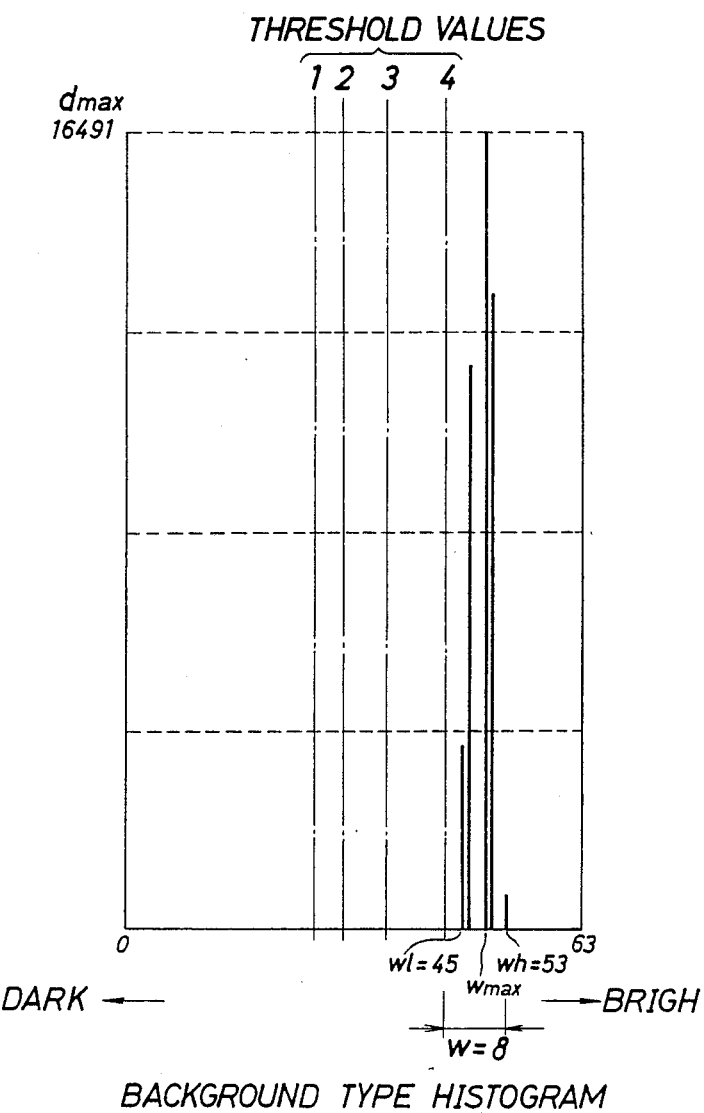
FIGS. 20 to 26E actually generated histograms.
Figure 22:
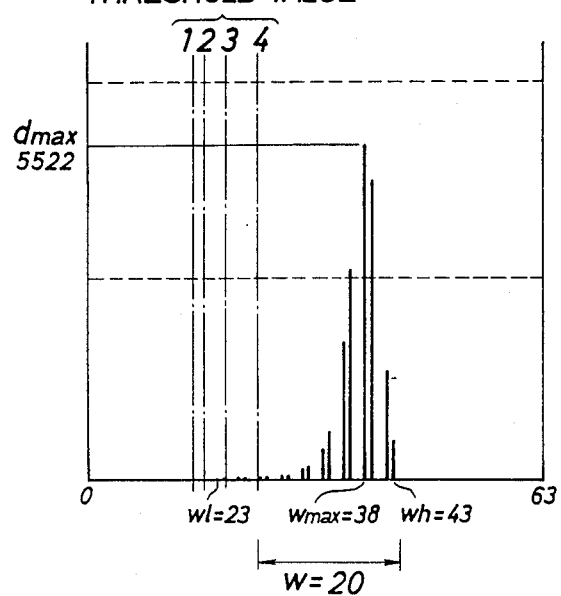
Figure 25:
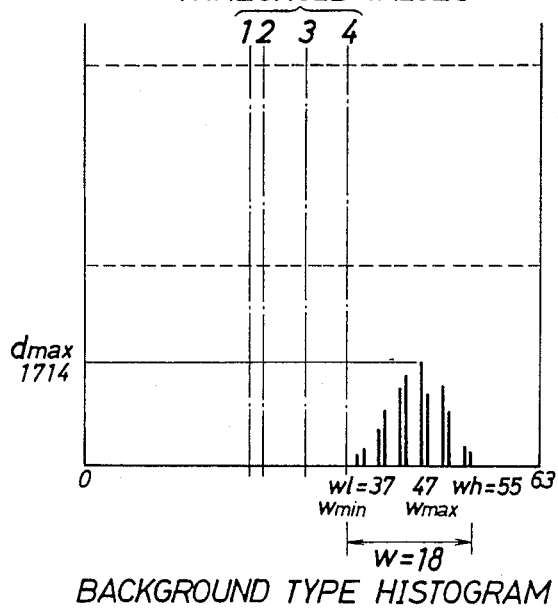

FIGS. 20, 22, and 25 show background type histograms.

Figure 21:
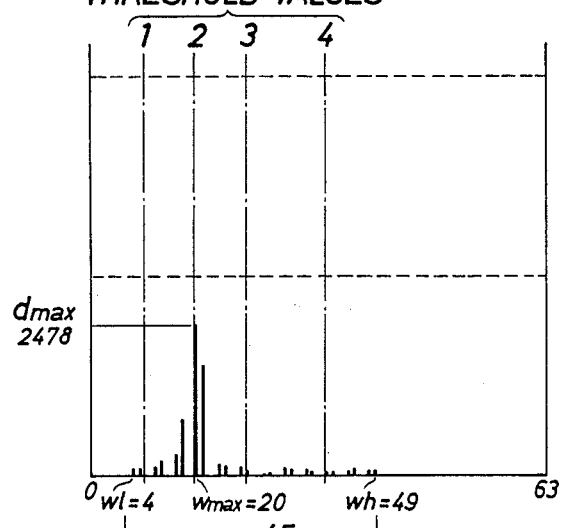
Figure 24:
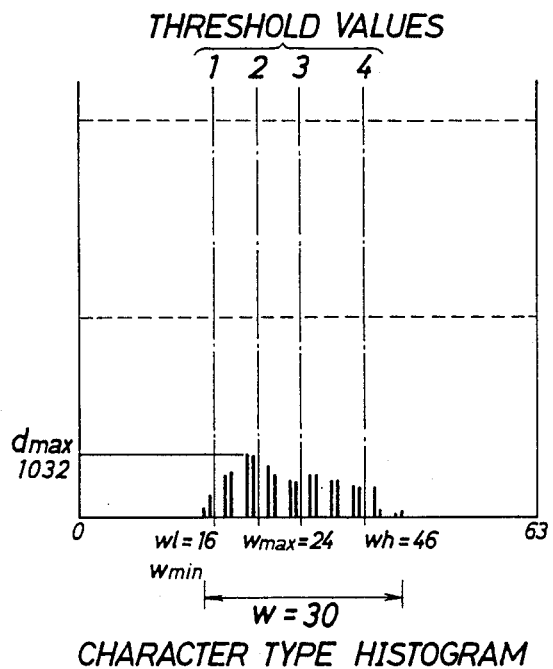

FIGS. 21 and 24 show character type histograms.

Figure 23:
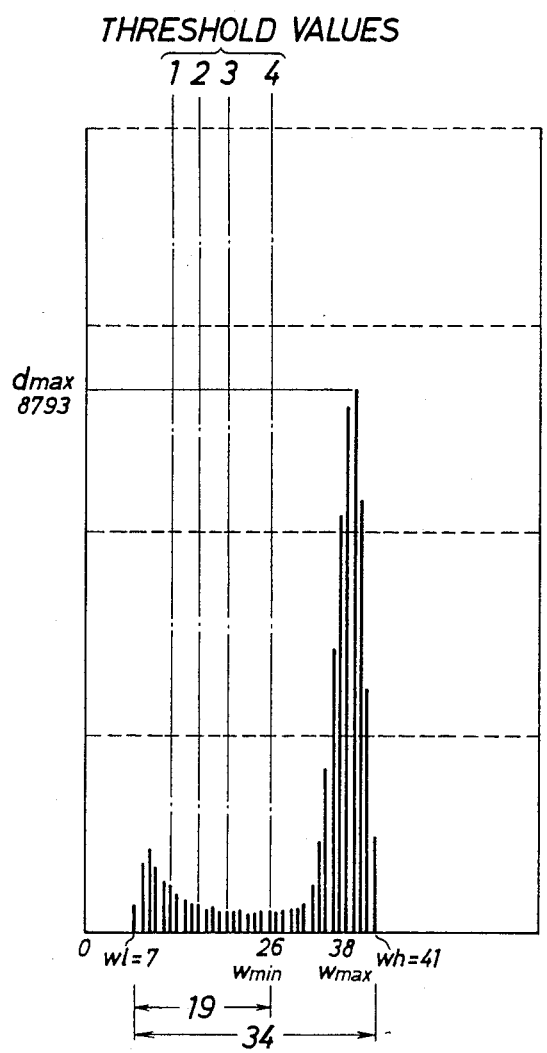

FIG. 23 shows a mixed type histogram.

When the histogram shape is determined, corresponding threshold values are calculated. Processing for converting image data into five-value data will be exemplified. In this case, four threshold values are used to perform multi-value processing, so that threshold value to threshold value 4 must be calculated. Examples of threshold values are shown below.

(Background Type)

Threshold value $1 = Wl + Wl \times (-0.45)$
Threshold value $2 = Wl + Wl \times (-0.35)$
Threshold value $3 = Wl + Wl \times (-0.20)$
Threshold value $4 = Wl + Wl \times (-0.05)$ Since correction coefficients (values within parentheses) are negative values, threshold value 1 to threshold value 4 are set to the left of the minimum value Wl (FIG. 20).

(Character Type)

Threshold value $1 = Wl + W \times (0.10)$
Threshold value $2 = Wl + W \times (0.30)$
Threshold value $3 = Wl + W \times (0.50)$
Threshold value $4 = Wl + W \times (0.08)$ Threshold value 1 to threshold value 4 are set within the luminance level width W with reference to the minimum value Wl.

(Mixed Type)

Threshold value $1 = Wl + W \times (0.30)$
Threshold value $2 = Wl + W \times (0.50)$
Threshold value $3 = Wl + W \times (0.07)$
Threshold value $4 = Wl + W \times (1.00)$ Threshold value 1 to threshold value 4 are set between the minimum value Wl and the minimum luminance level Wmin.

Values within parentheses are parameters for setting threshold value 1 to threshold value 4. Good results were obtained when these threshold values fell within the above ranges.

When a histogram is not determined as any one of the character, background, and mixed type histograms, it is processed as one of other types of histogram.

When other types of histogram are determined, a predetermined value, i.e., a fixed value is used as a threshold value. In this embodiment, a central value used in manual setting is used as a fixed value. However, the fixed value is not limited to this.

These threshold values are calculated in units of colors or manually set. The image data is processed into multi-value data on the basis of the set threshold values.

A histogram shape is determined to belong to a type other than other types of histogram, its threshold value may be selected from a plurality of threshold values manually set in the same manner as in other types of histogram.

Figure 17:
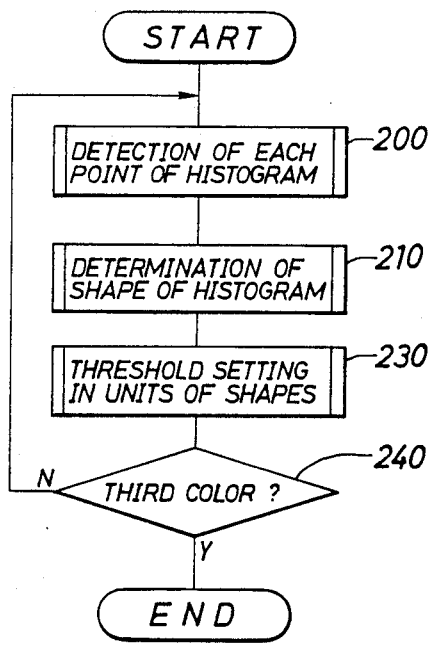
FIG. 17 is a flow chart showing a threshold value calculation processing routine.

Threshold calculations will be described with reference to FIG. 17.

Each point of a histogram is calculated on the basis of density histogram data (step 200). Each point represents the maximum or minimum value Wh or Wl shown in FIG. 16.

After each point of the density histogram is calculated, a histogram shape is determined (step 210).

In the shape determination step 210, the histogram shapes are classified into the background, character, and mixed type histograms and other types of histogram (FIGS. 20 to 25).

The background portion has a uniform density and has a larger area than that of the character portion. Therefore, the background type histogram has a narrow, high inverted U shape as shown in FIG. 20.

A histogram having frequencies concentrated within a narrow density width (luminance level width) is defined as a background type histogram.

To the contrary, the character portion has a nonuniform density and a smaller area than that of the background portion. The character type histogram has a wide, low inverted U shape (FIG. 24).

A histogram having a frequency distribution with a large density width is defined as the character type histogram.

The mixed type histogram is defined as a combination of the background and character type histograms (FIG. 23).

A histogram which does not belong to any one of the above types is defined as one of other types of histogram.

When determination of a shape of a density histogram is completed, optimal threshold values are calculated in units of shapes (step 230).

Operations in steps 200 to 230 are sequentially performed in units of colors. When operations for all colors are completed (step 240), a threshold determination processing routine is completed.

Figure 18:
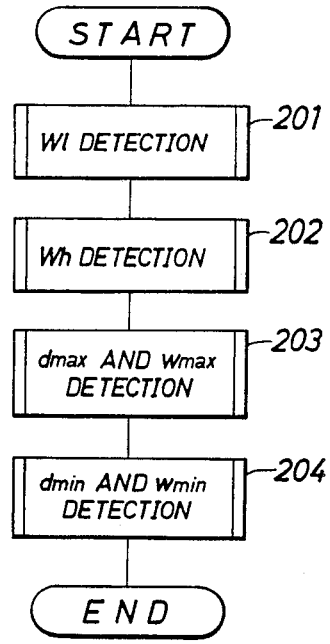
FIG. 18 is a flow chart showing a routine for calculating data point of a histogram.

FIG. 18 shows a processing routine for calculating each point of the density histogram.

Referring to FIG. 18, the minimum value Wl is calculated, and the maximum value Wh, the maximum frequency dmax, the corresponding maximum luminance level Wmax, the minimum frequency dmin, the corresponding minimum luminance level Wmin are calculated in the order named (steps 201 to 204).

During detection of each point, frequency levels to be excluded from the detection operations are determined. That is, frequency levels near the maximum and minimum frequency levels are neglected because they tend to be affected by noise. These frequency data are dealt as insignificant data.

The frequency data which are within 0.1% (i.e., about 50) of the number of pixels (about 64,000) present within the prescan area shown in FIG. 3 are not counted during detection of the minimum value Wl and the maximum value Wh.

Figure 19:
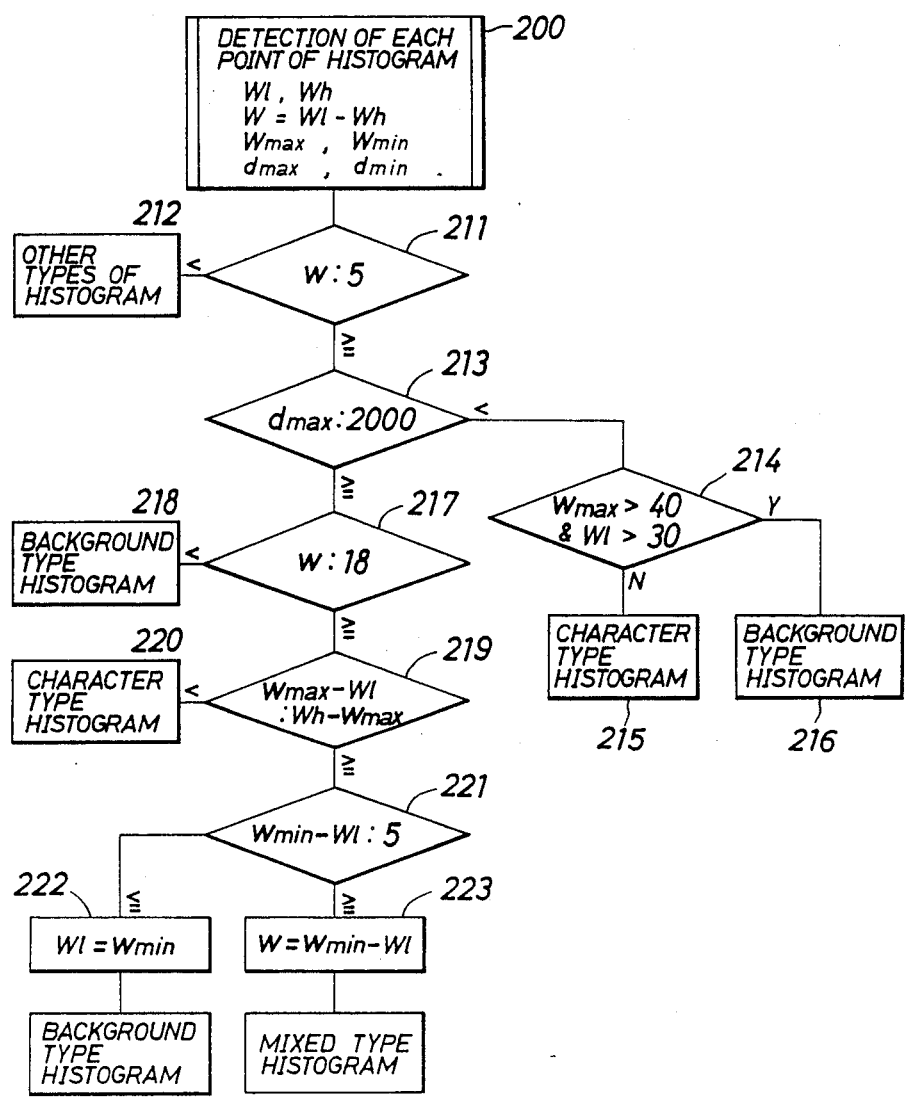
FIG. 19 a flow chart of a histogram shape determination processing routine.

FIG. 19 shows a routine for density histogram shape determination processing.

Shape determination is performed on the basis of point data calculated in processing routine 200.

The luminance level width W is determined (step 211). The luminance level width W has different values due to the number of multi-value levels.

In this embodiment, since 5-value processing is performed, four threshold values must be prepared. In the character type density histogram (FIG. 24), since four threshold values must be set within its luminance level width W, the luminance level width W is 5 or more. The predetermined value in step 211 is set with reference to "5".

The luminance level width W is determined in step 211. If the width W is less than the predetermined value, the density histogram shape is determined not to belong to any one of the background, character, and mixed type histograms and is processed as one of other types of histogram (step 212).

These types are selected, the predetermined fixed value is selected as a threshold value. A central value used in manual setting can be used as the fixed value.

An old newspaper is imaged as a document, individual color density histograms and a total density histogram shown in FIGS. 26A to 26E are obtained.

Figure 26A:
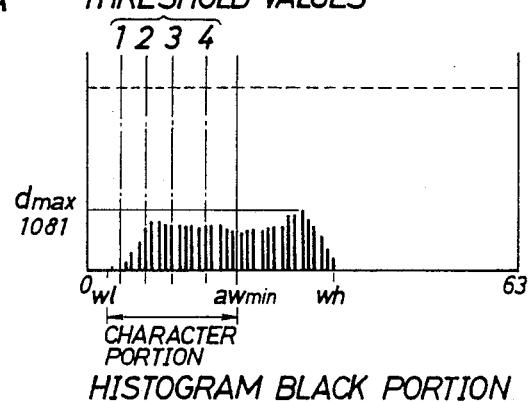
Figure 26B:
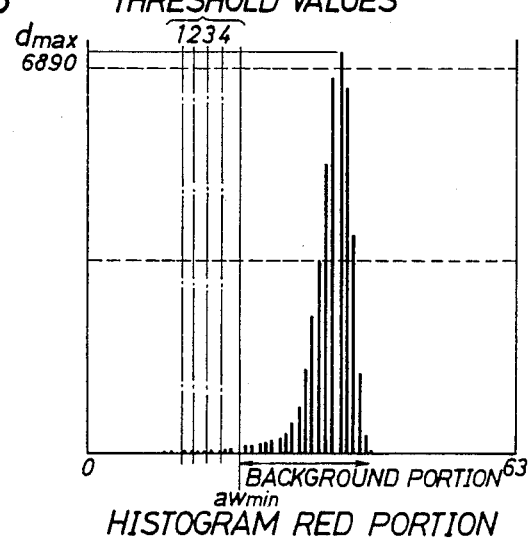
Figure 26C:
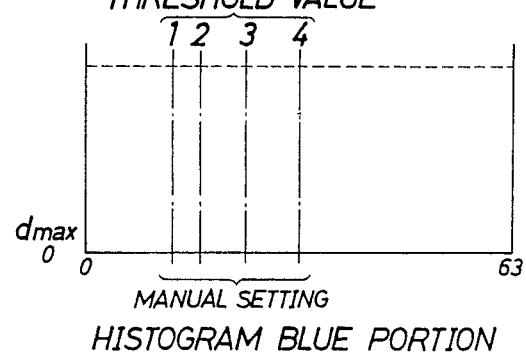
Figure 26D:
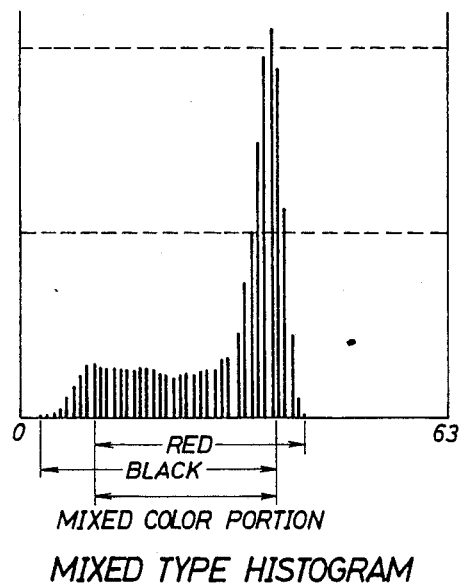
Figure 26E:
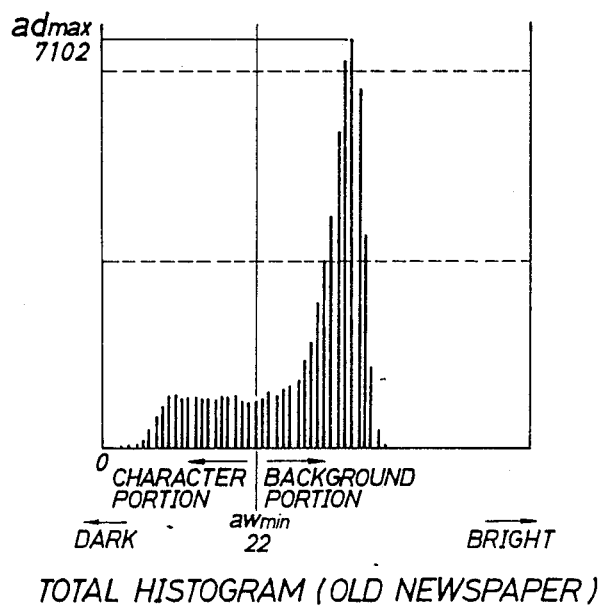

In this case, when the blue component is not included in the old newspaper, threshold value 1 to threshold value 4 for the central value of blue used in manual setting are set, as shown in FIG. 26D.

When the density histogram shape is determined not to belong to any one of the background, character, and mixed type histograms, the threshold values for the central value in manual setting are used in order to prevent setting of extreme or unstable threshold values.

Manual threshold values are available in units of colors.

When the luminance level width W is larger than the predetermined value, the maximum frequency dmax is checked in step 213.

When a character document is to be read, a character portion area is generally 1 to 5%. A value (about 2,000) corresponding to 3% of the total number of pixels (64,000) was set as a value for discriminating the character portion from the background portion. Good results were obtained.

A histogram having the maximum frequency dmax smaller than the set value is given by a document character portion having a specific color. If the maximum frequency dmax is smaller than the set value, a relationship between the maximum luminance level Wmax and the minimum value Wl is determined in step 214.

When an entire histogram has luminance levels higher than a ½ level of all luminance levels (0 to 63), this histogram is detected to represent a background portion. That is, if the histogram peak is higher than a level at a ⅔ position in the luminance range (e.g., Wmax>40 in the higher luminance side) and the minimum value of the left end of the histogram is higher than a level at a ½ position in the luminance range (e.g., Wl>30) in the higher luminance range), this histogram is detected to represent a background portion.

If the above conditions are not satisfied, a portion subjected to processed is processed as a character portion (steps 215 and 216).

A character type histogram is shown in FIG. 24. This indicates a blue letter portion.

A background type histogram is shown in FIG. 25. This indicates a histogram of graph paper. Graph paper is determined to be a background portion and is not recorded.

When the maximum frequency dmax is higher than the set value, the luminance level width W is checked again (step 217).

When a background determination level width has levels lower than a level at ⅓ position in the luminance range, an upper limit value of the background level is set in step 217. In this embodiment, the upper limit value is 18.

As a result, when the luminance level width W is smaller than the set value, a portion subjected to processing is detected as a background portion (step 218), as shown in FIG. 20.

When the luminance level width W is larger than the set value, offset of a peak position of the histogram is determined (step 219).

For this purpose, a difference (Wmax-Wl) between the maximum luminance level Wmax and the minimum value Wl and a difference (Wh-Wmax) between the maximum value Wh and the maximum luminance level Wmax are checked.

If a histogram peak position is located in the first half of the histogram range, that is, if $$(Wmax-Wl) > (Wh-Wmax)$$

this histogram is determined as a character type histogram (step 220). This histogram is used to determine a large character image filled with only characters, as shown in FIG. 21.

To the contrary, if $(Wmax-Wl) \leq (Wh-Wmax)$ is obtained, a luminance level difference between the minimum luminance level Wmin and the minimum value Wl is determined in step 221.

If a background portion is nonuniform, the luminance level difference tends to be 5 or less. Condition Wmin Wl can be established (step 222). In this case, this portion is processed as a background portion. Newspapers usually belong to this (FIG. 22).

When the luminance level difference is 5 or more, the following relation is established, as shown in step 223:

$$W = Wmin - Wl$$

This histogram is processed as the mixed type histogram, as shown in FIG. 23.

The histogram shapes in units of colors are determined in the above processing routine 210), and therefore the histogram shapes are classified.

Calculations and setting of threshold values corresponding to the histogram shapes are performed in the next processing routine 230.

The relationships between threshold values and the histogram shapes, i.e., the background, character, and mixed type histograms and other types of histogram are exemplified below.

(Background Type)

Threshold value $1 = Wl + Wl \times (-0.45)$
Threshold value $2 = Wl + Wl \times (-0.35)$
Threshold value $3 = Wl + Wl \times (-0.20)$
Threshold value $4 = Wl + Wl \times (-0.05)$ Since correction coefficients (values within parentheses) are negative values, threshold value 1 to threshold value 4 are set to the left of the minimum value Wl (FIGS. 20, 22, and 25).

(Character Type)

Threshold value $1 = Wl + W \times (0.10)$
Threshold value $2 = Wl + W \times (0.30)$
Threshold value $3 = Wl + W \times (0.50)$
Threshold value $4 = Wl + W \times (0.80)$ Threshold value 1 to threshold value 4 are set within the luminance level width W with reference to the minimum value Wl (FIG. 24).

(Mixed Type)

Threshold value $1 = Wl + W \times (0.30)$
Threshold value $2 = Wl + W \times (0.50)$
Threshold value $3 = Wl + W \times (0.70)$
Threshold value $4 = Wl + W \times (1.00)$ Threshold value 1 to threshold value 4 are set between the minimum value Wl and the minimum luminance level Wmin (FIG. 23).

Values within parentheses are parameters for setting threshold value 1 to threshold value 4. Good results were obtained within the above ranges.

These threshold values in units of colors are calculated or manually set, and the image data is subjected to multi-value processing on the basis of the set threshold values.

(Other Types)

When a histogram does not belong to any one of the background, character, and mixed type histograms, it is processed as one of other types of histogram.

When these types are selected, the predetermined value, i.e., the fixed value is used as the threshold value. In this embodiment, the central value used in manual setting is set as the fixed value. However, the fixed value is not limited to this.

When a histogram shape is determined as a shape other than other types of histogram, its threshold value can be selected from a plurality of threshold values used in manual setting in the same manner as in other types of histogram.

In the above embodiment, the image data is processed into five-value data. However, the number of levels of the image data is not limited to a specific number if it is two or more.

Another operation for setting threshold values by the density histogram generator 100 under the control of the CPU 160 will be described below.

The histogram generator 100 in FIG. 1 generates individual color density histograms and a total density histogram by using the individual color density histograms.

The total density histogram is defined as a histogram obtained by adding frequency data of the individual color density histograms.

The generated density histogram data are processed by the CPU 160 to calculate threshold values (admax) for the background portion from the total density histogram.

The threshold value setting means comprises the histogram generator 100 and the CPU 160.

The individual color density histograms are used to discriminate a normal document, a reversed document, and a document having a mixed density, and the corresponding threshold values are set.

At the time of threshold value setting, shapes of the individual color density histograms are determined.

It is preferable that histogram shapes are classified into the background and character (mixed) type histograms and other types of histogram as a result of various experiments.

Threshold values corresponding to a type of document and a density histogram shape are calculated. An operation for processing image data into 5-value data will be exemplified. Since the image data is converted into 5-value data by using four threshold values (threshold value 1 to threshold value 4), these four threshold values must be calculated.

When a density histogram shape is detected as a shape other than other types of histogram, its threshold value can be selected from a plurality of threshold values used in manual setting in the same manner as in other types of histogram in the apparatus.

After the individual color density histograms are generated, a total density histogram is calculated by using the individual color density histogram data. At the same time, threshold value 1 to threshold value 4 are calculated in the CPU 160.

Calculations of threshold values will be described with reference to the accompanying drawings from FIG. 27.

Figure 27:
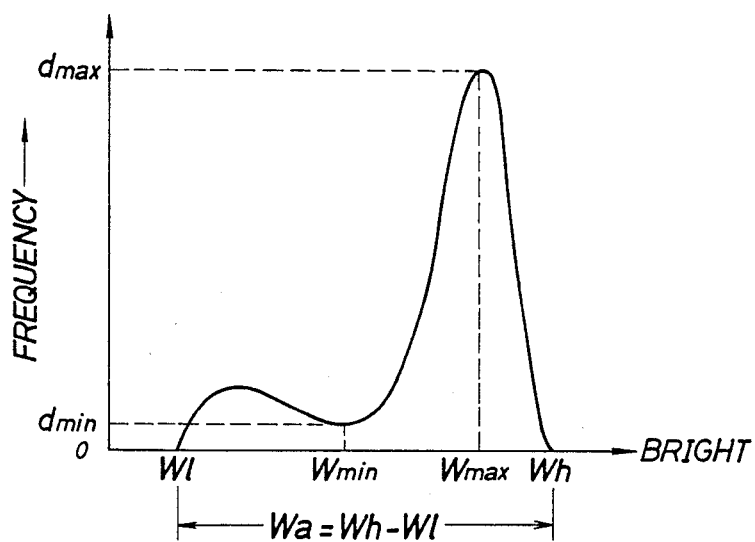
FIG. 27 is an individual color density histogram.

An individual color density histogram is illustrated in FIG. 27. A total density histogram generated by the individual color density histograms is illustrated in FIG. 28.

Figure 29:
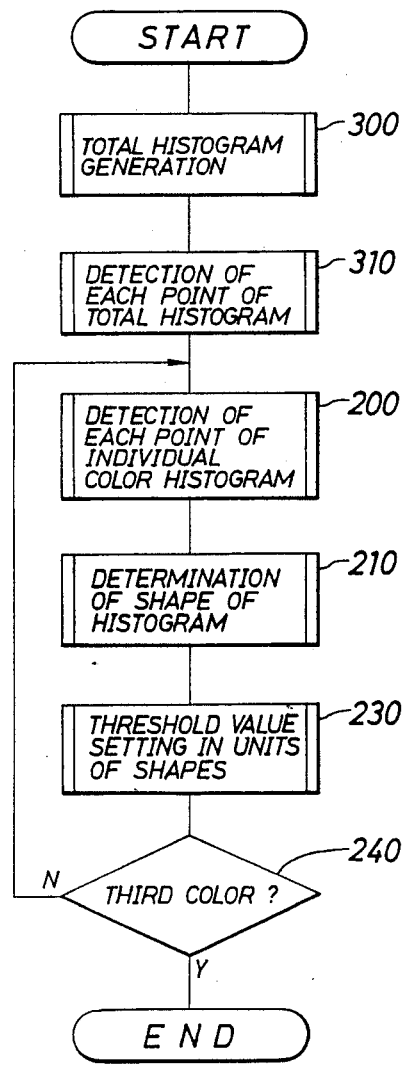
FIG. 29 is a flow chart of a threshold value calculation processing routine.

FIG. 29 is a flow chart for explaining an operation for calculating threshold values of a density histogram.

A total density histogram is generated by the individual color density histograms generated by the histogram generator 100 (step 300).

Figure 28:
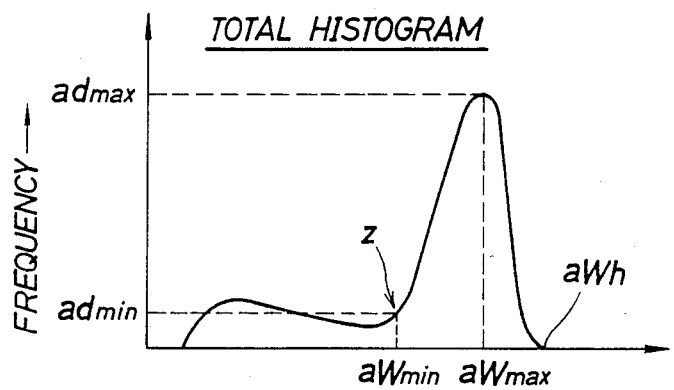
FIG. 28 is a total density histogram.

Point data shown in FIG. 28 are calculated by the total density histogram (step 310).

Necessary data are a maximum frequency admax, a corresponding maximum luminance level awmax, a frequency admin at a base portion z, and a corresponding luminance level (base luminance level) awmin.

Necessary data of the necessary density histogram are calculated by frequency data of the individual color density histograms (step 200). This processing includes processing of a document having a mixed density.

The necessary data of the necessary density histogram are maximum and minimum values Wh and Wl, a maximum frequency dmax, a corresponding luminance level Wmax, a minimum frequency dmin, and a corresponding luminance level Wmin.

After the necessary data of the density histogram are calculated, histogram shapes in units of colors are determined (step 210).

In shape determination step 210, the type of document, i.e., normal document or reversed document, is determined. The type of histogram of the determined document is determined as the background type histogram, the character type of histogram, and other types of histogram.

A background portion of a normal document has almost a uniform density and a larger area than that of a character portion. In addition, the background portion is brighter than the character portion. As a result, a histogram has a narrow inverted U shape and the frequency data are concentrated on the brighter side.

When individual color density histograms are present on the brighter side than the base portion detected by the total density histogram, the density histogram data is determined to represent a background portion.

The frequency data (base frequency data) of the base portion z are used as threshold values of the background portion.

Figure 34A:
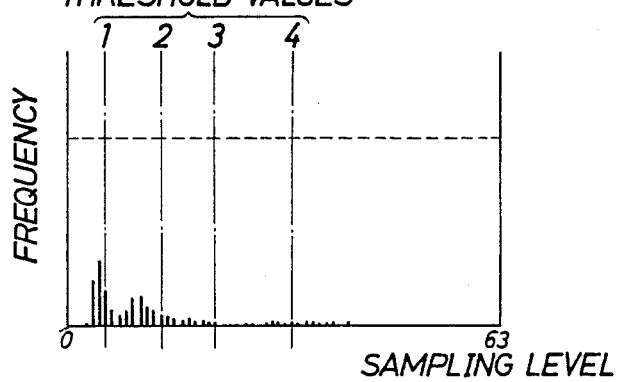
FIGS. 34A to 35D are individual color density histograms and corresponding total density histograms.
Figure 34B:
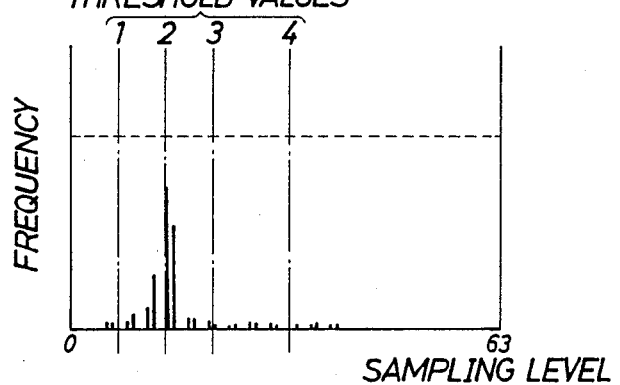
Figure 34C:
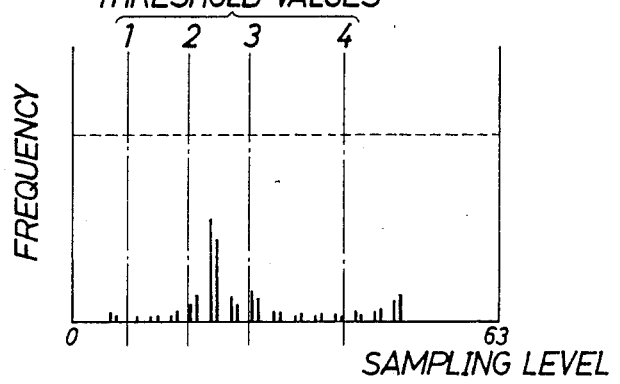
Figure 34E:
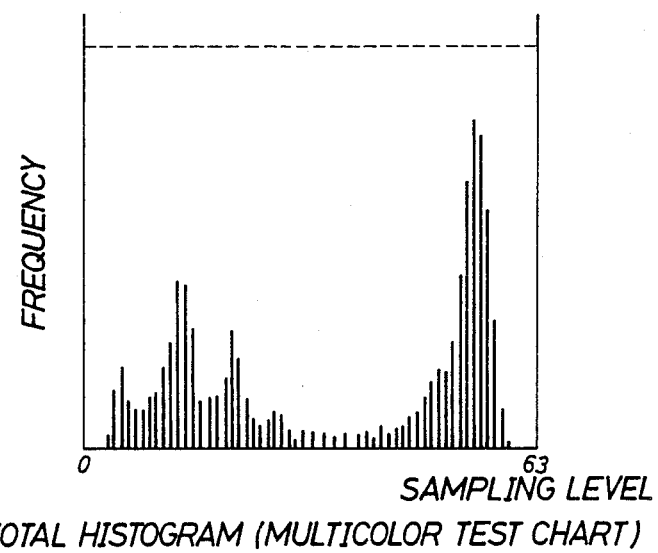
Figure 34D:
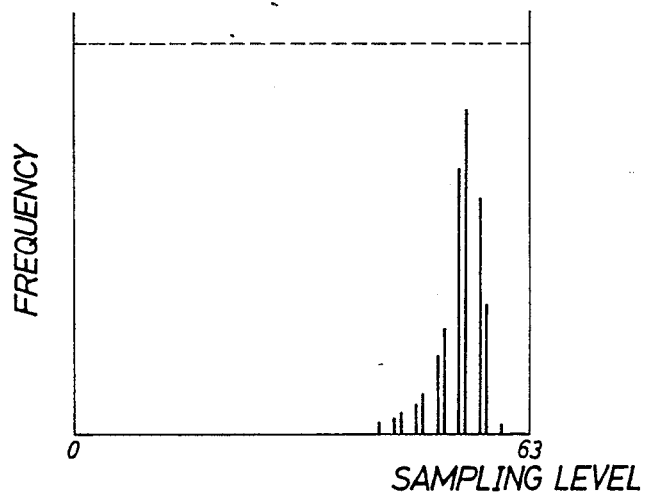

To the contrary, the character portion has a nonuniform density distribution as compared with that of the background portion and a smaller area than the background portion. Therefore, the character type histogram has a flat inverted U shape. When the frequency data of the individual color density histograms are present in levels lower (darker) than those of the base portion z (FIGS. 34A and 34B) or the frequency data are present to be spread on the brighter and darker sides (FIG. 35A), the side lower (darker) than the threshold values of the background portion is detected as a character portion, and the threshold values are set in this region.

Histogram shapes which do not belong to any defined shapes are classified into other shapes of histogram.

Since a white toner component is absent in the reversed document such as a hollow character, its background portion must have a high density, i.e., must be output as a black portion. When only the background portion is eliminated as in the normal document, only a blank sheet is output.

Figure 36A:
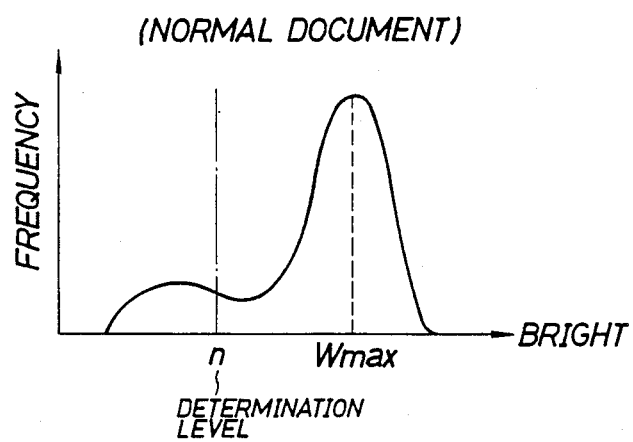
FIGS. 36A and 36B are histograms of a normal document and a reversed original, respectively.
Figure 36B:
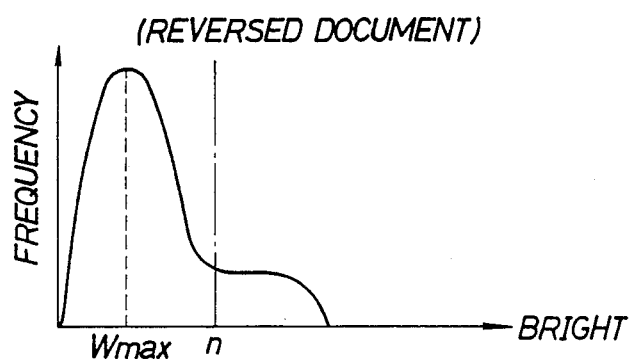

Since the reversed document has opposite background-character relationship to the normal document. As shown in FIG. 36B, the background portion of the document is located in the left side (dark side) of the character portion on the histogram.

When a document is determined as a reversed document, threshold values of the character type histogram are set for the background portion.

When the density histogram shape determination is completed, optimal threshold values are calculated for each shape (step 230).

The operations in steps 200 to 230 are sequentially processed in units of colors. When operations for all colors are completed (step 240), the threshold determination processing routine is ended.

Figure 30:
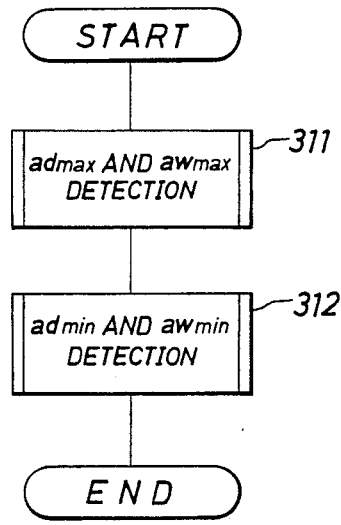
FIG. 30 is a flow chart showing a processing routine for calculating data of each point of the total density histogram.

FIG. 30 shows a processing routine for calculating each point of the total density histogram.

Referring to FIG. 30, the maximum frequency admax and the corresponding maximum luminance level aWmax are calculated from the maximum value aWh side (step 311).

The base portion z is detected from the maximum frequency admax side (step 312). The base portion z is detected as follows. The adjacent frequency data are compared. When the two latest frequency data are continuously larger than the previous frequency data, the frequency data which is two ahead of the current frequency data is used as the frequency data admax of the base portion z.

The corresponding luminance level aWmin is used as a boundary level between the character and background portions on the histogram.

Figure 31:
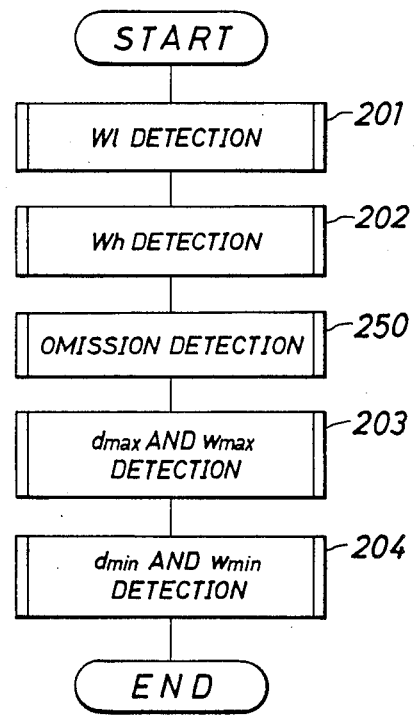
FIG. 31 is a flow chart showing a processing routine for calculating data of each point of the individual color density histogram.

FIG. 31 shows a processing routine for calculating each point of the individual color density histograms.

Figure 37A:
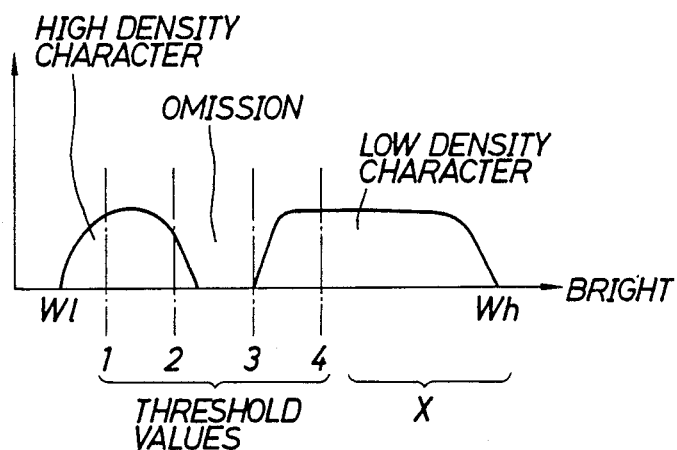
FIGS. 37A and 37B are density histograms of a mixed document including light and dark colors.
Figure 37B:
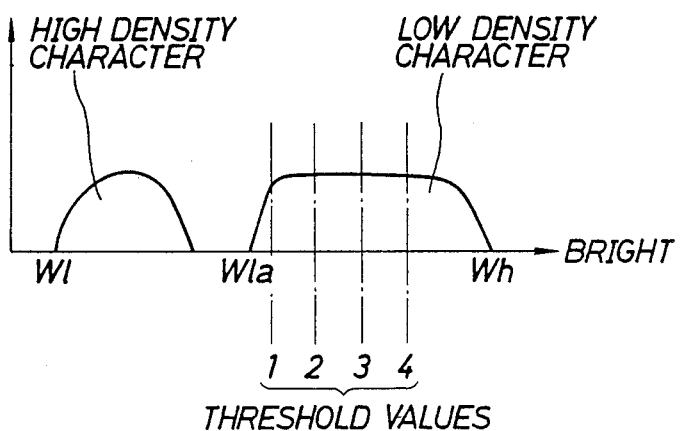

Referring to FIG. 31, the minimum value Wl and the maximum value Wh are calculated. Omission detection of the frequency data in the histogram is performed so as to cope with the document having a mixed density. When a frequency omission is detected, the minimum value Wl is corrected to Wla, as shown in FIG. 37B (steps 201, 202, and 250).

The maximum frequency dmax, the corresponding maximum luminance level Wmax, the minimum frequency dmin, and the corresponding minimum luminance level Wmin are sequentially calculated in the order named (steps 203 and 204).

The minimum values Wl and the maximum values Wh of the individual color density histograms are detected within the following density levels, and a threshold value setting range is defined.

Black: within level 4 to level 41
  Blue: within level 15 to level 41
  Red: within level 25 to level 45

The above definition is made to cope with the practical density characteristics. Unnecessary arithmetic operations can be omitted, and the threshold values can be optimized. In this embodiment, the levels corresponding to the practical densities of 1.0 to 0.1 were determined in units of colors as described above. Good results could be obtained.

After determination of the document having a mixed density and determination of the normal or reversed document are performed, the type of histogram, i.e., the background or character type histogram, is determined, and the corresponding threshold values are determined. These operations will be described in detail below.

Figure 32:
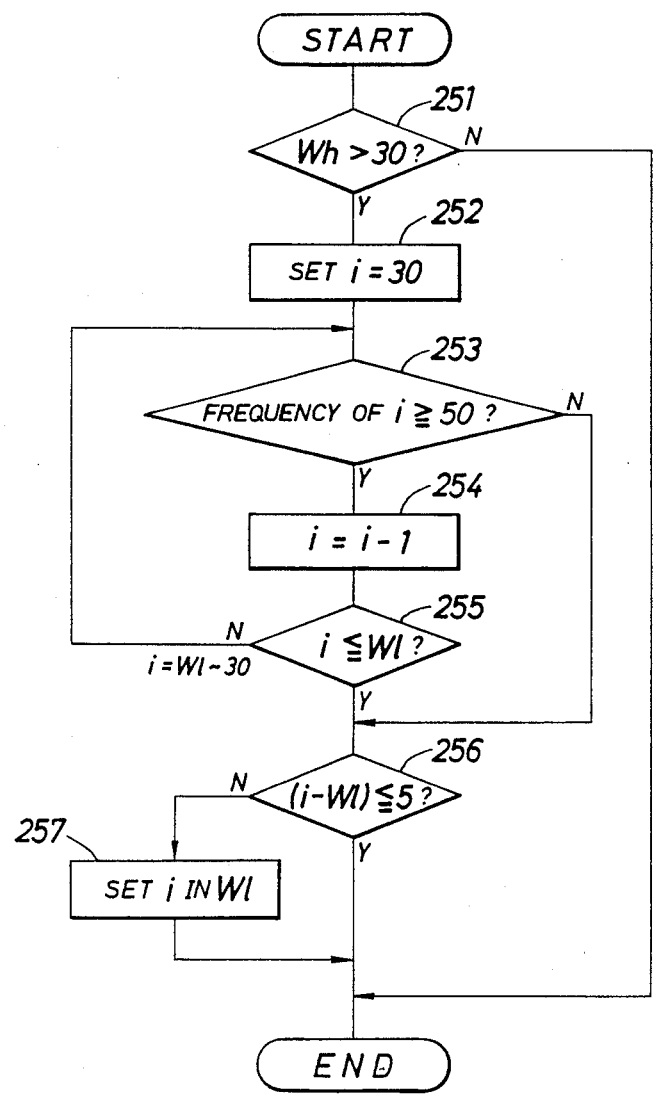
FIG. 32 is a flow chart showing an omission detection routine in the individual color histogram.

FIG. 32 is a processing routine for changing the minimum value Wl into Wla when the document having a mixed density is determined and detected. The document having a mixed density can be detected upon detection of the frequency data omission.

In order to determine whether a character histogram includes a low-density portion, the level of the maximum value Wh of the histogram is determined. The reference density range for determination reference is set within level 0 to level 30. In this embodiment, the range includes 30 levels (step 251). When a density is higher than the reference density, the following processing is not performed.

When a histogram includes a low density, it is determined whether a frequency data omission is detected. For this purpose, a count value i of a counter is set to be a reference density value (=30) (step 252), and it is then checked if the frequency represented by the count value i exceeds a frequency data elimination value (step 253).

The frequency data elimination value represents a frequency for noise elimination. When a variation width caused by noise is defined as a range of 0.1% or less (about 64 frequency data) of the total number of pixels (64,000 pixels in this embodiment) present within the prescan area shown in FIG. 3, the frequency data elimination value can fall within the range of 0.1% or less. This value is set to be 50 in this embodiment.

The count value i is smaller than the frequency data elimination value, a difference between the count value i and the minimum value Wl is calculated to compare these values (step 256). When the difference is larger than a predetermined value, the frequency data omission is determined to be present, and the minimum value is changed.

The predetermined value is a value obtained in consideration of multi-value processing. If 5-value processing is performed, a difference of five or more levels is required. In this embodiment, the predetermined value is 5. When the predetermined value is 5 or more, the minimum value Wl is changed to the count value i (step 257). That is, in this case, the count value i is used as the corrected minimum value Wl (=Wla).

When the count value i is smaller than the predetermined value, omission processing does not provide a great effect. In this case, the calculated minimum value Wl is used without a change.

The frequency value represented by the count value i is larger than the frequency data elimination value, the count value i is decremented to shift the frequency distribution to the higher-density side (step 254). The corresponding count value i is compared with the minimum value Wl. If the count value i is larger than the minimum value Wl, the flow returns to step 253 again, and the same operations as described above are performed.

In this processing step, when the frequency value represented by the count value i is smaller than the frequency data elimination value, the flow advances to step 256. Similarly, in step 255, when the count value i is equal to or larger than the minimum value Wl, the flow also advances to step 256.

In either case, the minimum value Wl is corrected with reference to the decremented count value i (steps 256 and 257).

As described above, when the frequency data omission is detected, the minimum value Wl is changed to Wla, and threshold value 1 to threshold value 4 are determined on the basis of the updated minimum value (FIG. 37B). As a result, a low-density character portion is not omitted.

Figure 33:
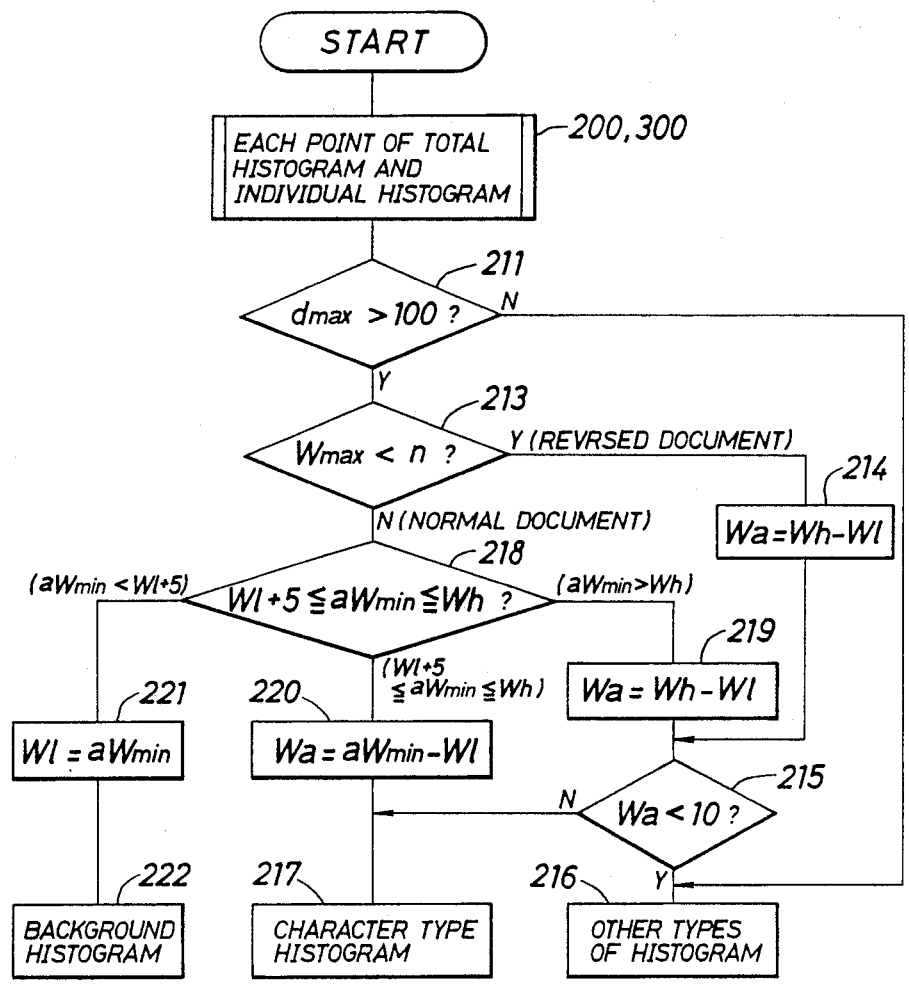
FIG. 33 is a flow chart showing a histogram shape determination processing routine.

FIG. 33 is a shape determination processing routine 210 of the density histogram.

Shape determination is performed on the basis of point data calculated in processing routines 200 and 300.

The maximum frequency dmax is determined (step 211).

In step 211, the individual color density histograms are determined whether to belong to the background or character type histogram. That is, it is determined whether the density histogram frequency data are present. For this purpose, a determination value is (frequency data elimination value)+(given constant) (e.g., 100).

Figure 35A:
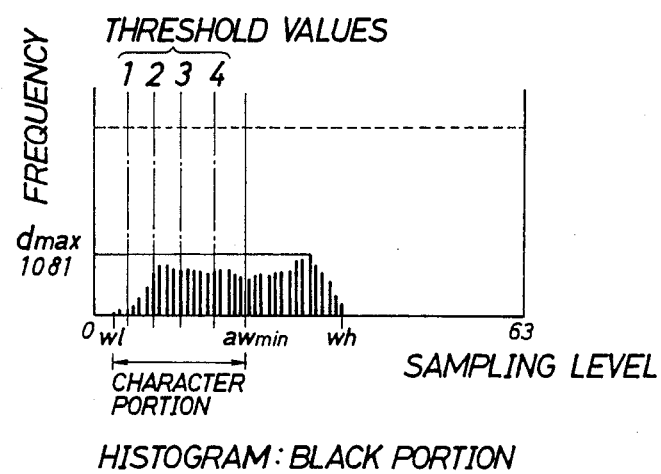
Figure 35B:
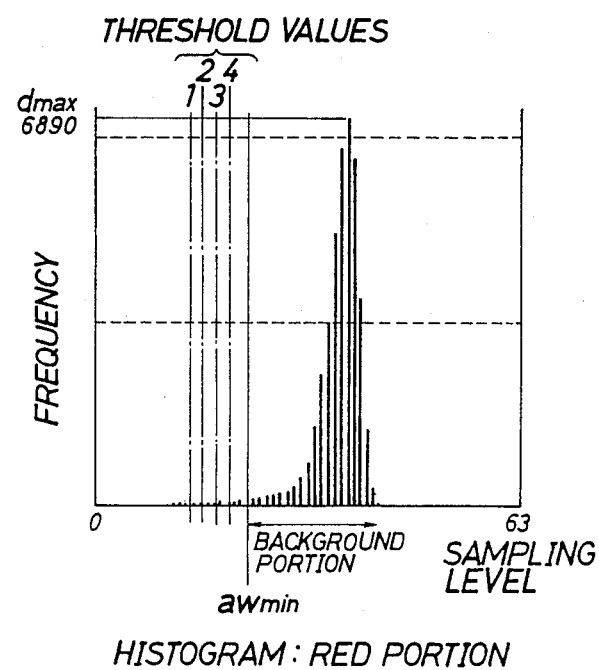
Figure 35C:
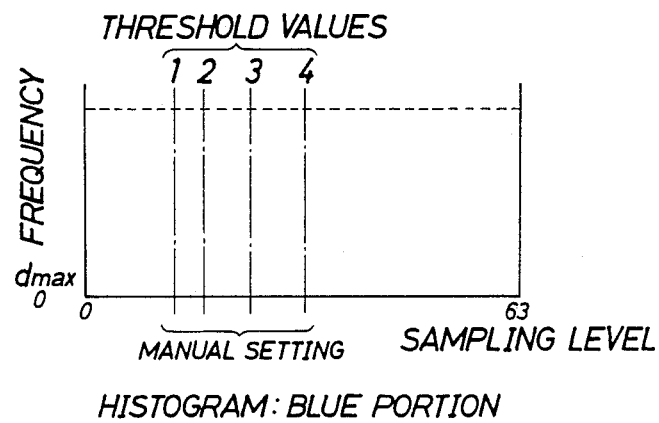
Figure 35D:
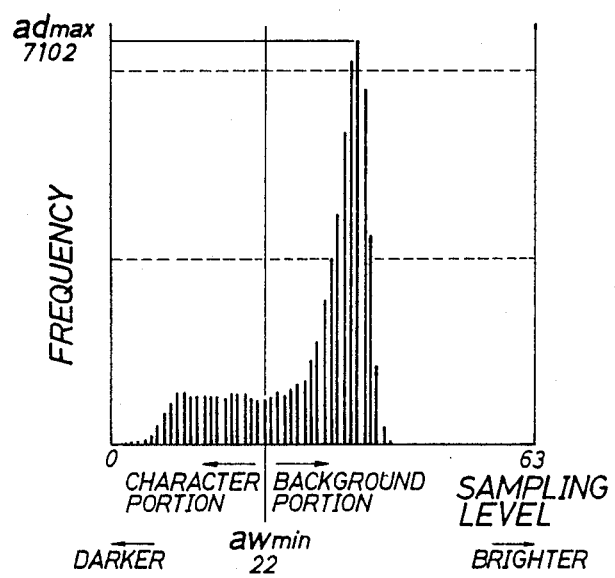

If histograms are determined not to belong to the background or character type histograms and the frequency data shown in FIG. 35C is not present, these histograms are determined as other types of histogram (step 216).

When other types are determined, the central value or the like used in manual setting is used (FIG. 35C).

When the density histogram does not belong to the background or character type histogram, the central value is used as the threshold value to prevent setting of extreme or unstable threshold value.

Manual threshold values are also prepared in units of colors.

Determination of a normal or reversed document is performed (step 213).

The normal or reversed document is determined on the basis of the fact whether the maximum luminance level Wmax of the background portion is located on the lower- or higher-level side.

As a result of testing of densities of various sheets used for the normal document, an optimal determination level as density level 27 (i.e., about 0.35 in reflection density) was good.

The maximum luminance level Wmax of each individual color density histogram is lower than the determination level n, processing of the normal document is performed. To the contrary, when the maximum luminance Wmax is higher than the determination level n, processing of the reversed document is performed.

When a document is determined as the reversed document, a density width (histogram width) Wa is calculated (step 214). The histogram width Wa is defined as follows:

$$Wa = Wh - Wl$$

When the histogram width Wa is a predetermined value or more, this histogram is determined as the character type histogram, and the corresponding threshold values are set (steps 215 and 217). When the histogram width Wa is smaller than the predetermined value, this histogram is determined to belong to other types of histogram, and corresponding processing is performed (steps 215 and 216).

The predetermined value serving as the determination reference is a minimum histogram width required for setting a multi-value processing threshold values (5-value processing in this embodiment). The predetermined value was appropriately 10 according to experiments.

In the reversed document, even if its background portion has large histogram frequency data, the threshold values for the character type histogram are set. It should be noted that if a histogram width is narrow (i.e., a small volume of histogram data), processing for other types of histogram is performed.

To the contrary, when the document is determined as the normal document, the minimum luminance level aWmin (boundary level between the character and background portions) detected by the total density histogram is compared with the minimum and maximum values Wl and Wh of the individual color density histograms (step 218).

When each individual color density histogram is located on the high-density side (left side) of the boundary level aWmin, that is, if $$aWmin > Wh$$

the histogram width Wa is calculated by the following relation (step 219):

$$Wa = Wh - Wl$$

the histogram of interest is processed as the character type histogram or one of other types of histogram. That is, when the valve of the histogram width is larger than the predetermined value, processing for the character type histogram is executed. However, when the value of the histogram width is smaller than the predetermined value, processing for other types of histogram is executed (steps 215 to 217).

The predetermined value was about level 10 as in the reversed document, and good results could be obtained.

When the boundary level aWim is present in the individual color histogram, that is, if $$Wl + 5 \leq wWim \leq Wh$$

the histogram width Wa excluding the background portion is calculated as follows:

$$Wa = aWmin - Wl$$

and the character type histogram is obtained, and the corresponding threshold values are set (steps 220 and 217).

When the minimum value Wl of each individual color density histogram is changed to the boundary level aWim, $$aWmin < Wl + 5$$

the histogram as a whole is dealt as the background type histogram (steps 221 and 222).

In the above processing routine, the normal or reversed document is determined. At the same time, the density histogram shapes in units of colors can be determined to belong to the set shapes.

The threshold values corresponding to the determined shapes are calculated and set in the next processing routine 230.

Relationships between the threshold values and the histogram shapes, i.e., the background and character type histograms and other types of histogram will be described below.

(Background Type)

In this case, the density histogram as a whole is regarded to consist of only background data, and threshold values are set outside the density histogram.

As shown in FIG. 35B, the threshold values are set with reference to the minimum luminance level aWmin calculated by the total density histogram as follows:

Threshold value $1 = aWmin + aWmin \times (-0.45)$
Threshold value $2 = aWmin + aWmin \times (-0.35)$
Threshold value $3 = aWmin + aWmin \times (-0.20)$
Threshold value $4 = aWmin + aWmin \times (-0.05)$ Since correction coefficients are negative values, threshold value 1 to threshold value 4 are set to the right of the minimum luminance level aWmin (FIG. 35B).

(Character Type)

In this case, a density histogram range on the darker side of the base portion z of the total density histogram is regarded as a character portion.

As shown in FIG. 35A, a plurality of threshold values are set between the minimum value W1 and the minimum luminance level aWmin as follows:

Threshold value $1 = W1 + Wa \times (0.05)$
Threshold value $2 = W1 + Wa \times (0.15)$
Threshold value $3 = W1 + Wa \times (0.35)$
Threshold value $4 = W1 + Wa \times (0.60)$ These threshold values are calculated in units of colors, and the image data is processed into multi-value data with reference to the calculated threshold values.

In a document having a mixed density, W1a is often used in place of W1.

Numeric values within the parentheses are parameters for setting threshold value 1 to threshold value 4. Good results were obtained by the above ranges.

(Other Types)

When histograms do not belong to the character or background type histograms, they are processed as other types of histogram.

When other types of histogram are determined, the predetermined value, i.e., the fixed value is used as a threshold value (FIG. 35C). The central value used in manual setting is used as the fixed value. However, the fixed value is not limited to this.

When a histogram shape is detected as a shape other than other types of histogram, its threshold value can be selected from a plurality of threshold values used in manual setting in the same manner as in other types of histogram.

In the above embodiment, the image data is converted into 5-value data. However, the number of values can be 2 or more.

What we claim is:

1. An image processing apparatus comprising:
pixel data generating means for generating density data representing a density of each pixel of original image data and color data representing a color of each pixel, the density and color data being parallel data;
mode setting means for outputting a mode setting signal for setting a write mode and a read mode;
memory means capable of being arbitrarily set in the write mode and the read mode in response to the mode setting signal, said memory means being operated such that a memory content is changed in correspondence with the density data and the color data in the write mode and that a memory content corresponding to the color data externally accessed is read out in the read mode;
threshold value setting means for setting threshold values in units of color data on the basis of the memory content read out from said memory means in the read mode;
recording density data forming means for forming recording density data having a smaller number of bits by the set threshold values on the basis of the density data; and
recording means for performing recording on the basis of the recording density data.

2. An image processing apparatus comprising:
pixel data generating means for generating density data representing a density of each pixel of original image data and color data representing a color of each pixel, the density and color data being parallel data;
mode setting means for outputting a mode setting signal for setting a write mode and a read mode;
memory means capable of being arbitrarily set in the write mode and the read mode in response to the mode setting signal, said memory means being operated such that, in the write mode, said memory is addressed by the density data and the color data and data stored at an accessed address is incremented, and, in the read mode, all addresses corresponding to one of the color data which is externally accessed are accessed and data stored at the accessed addresses are read out;
control data forming means for forming control data on the basis of a series of data read out from said memory means in the read mode; and
processing means for processing the density data on the basis of the control data.

3. An apparatus according to claim 2, wherein said control data forming means reads out data corresponding to a plurality of color data from said memory means, adds the readout data, and forms the control data on the basis of the sum.

4. An image processing apparatus comprising:
image reading means consisting of a plurality of linear photoelectric transducer elements and an optical system for simultaneously forming an optical image from a document onto said plurality of photoelectric transducer elements, said plurality of photoelectric transducer elements being arranged to perform a main scan of the document and a subscan of the document at a speed corresponding to a designated magnification in a direction perpendicular to a direction of the main scan, so that each of said photoelectric transducer elements outputs a read signal in units of scan lines;
pixel data generating means for generating density data representing a density of each pixel of original image data and color data representing a color of each pixel, the density and color data being parallel data;
mode setting means for outputting a mode setting signal for setting a write mode and a read mode;

memory means capable of being arbitrarily set in the write mode and the read mode in response to the mode setting signal, said memory means being operated such that, in the write mode, said memory is addressed by the density data and the color data and data stored at an accessed address is incremented, and, in the read mode, all addresses corresponding to one of the color data which is externally accessed are accessed and data stored at the accessed addresses are read out;

threshold value setting means for setting threshold values in units of color data on the basis of the memory content read out from said memory means in the read mode;

recording density data forming means for forming recording density data having a smaller number of bits by the set threshold values on the basis of the density data; and recording means for performing recording on the basis of the recording density data.

5. A method of processing an image, comprising the steps of:
  (a) generating density data representing a density of each pixel of original image data and color data representing a color of each pixel, the density and color data being parallel data;
  (b) setting a write mode of memory means;
  (c) repeatedly updating a memory content in correspondence with the density data and the color data;
  (d) setting a read mode of the memory means;
  (e) externally reading out a memory content corresponding to one of the color data;
  (f) setting threshold values in units of color data on the basis of the memory content read out from the memory means;
  (g) forming recording density data having a smaller number of bits by the set threshold values on the basis of the density data; and
  (h) performing recording on the basis of the recording density data formed in step (g).

6. A method of processing an image, comprising the steps of:
  (a) generating density data representing a density of each pixel of original image data and color data representing a color of each pixel, the density and color data being parallel data;
  (b) setting a write mode of memory means;
  (c) repeatedly updating a memory content in correspondence with the density data and the color data;
  (d) setting a read mode of the memory means;
  (e) externally reading out a memory content corresponding to one of the color data;
  (f) setting threshold values in units of color data on the basis of the memory content read out from the memory means;
  (g) regenerating density data representing a density of each pixel of original image data and color data representing a color of each pixel, the density and color data being parallel data;
  (h) forming recording density data having a smaller number of bits by the threshold values set in step (f) on the basis of the density data obtained in step (g); and
  (i) performing recording on the basis of the recording density data formed in step (h).

7. A method of processing an image, comprising the steps of:
  (a) generating density data representing a density of each pixel of original image data and color data representing a color of each pixel, the density and color data being parallel data;
  (b) setting a write mode of memory means;
  (c) repeatedly addressing the memory by the density data and the color data and incrementing data at an accessed address;
  (d) setting a read mode of the memory means;
  (e) accessing all addresses corresponding to one of the color data and reading out data at the accessed addresses;
  (f) outputting control data on the basis of a series of data read out from the memory means; and
  (g) processing the density data on the basis of the control data.

* * * * *